US012647360B1

(12) United States Patent
Ye et al.

(10) Patent No.: US 12,647,360 B1
(45) Date of Patent: Jun. 2, 2026

(54) CUSTOMER-SPECIFIED ROUTING OPTION GROUPS AND SELECTION POLICIES FOR CLOUD NETWORK TRAFFIC

(71) Applicant: Amazon Technologies, Inc., Seattle, WA (US)

(72) Inventors: Shuai Ye, Herndon, VA (US); Matthew Browne Barr, Arlington, VA (US); Akshay Choudhry, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 18/542,456

(22) Filed: Dec. 15, 2023

(51) Int. Cl.
| | |
|---|---|
| *H04L 45/76* | (2022.01) |
| *H04L 45/12* | (2022.01) |
| *H04L 45/28* | (2022.01) |

(52) U.S. Cl.
CPC ............ *H04L 45/76* (2022.05); *H04L 45/124* (2013.01); *H04L 45/28* (2013.01)

(58) Field of Classification Search
CPC ....... H04L 45/76; H04L 45/124; H04L 45/28; H04L 45/22
See application file for complete search history.

(56) References Cited

U.S. PATENT DOCUMENTS

| | | | |
|---|---|---|---|
| 10,491,466 | B1 | 11/2019 | Hira |
| 10,574,577 | B1 * | 2/2020 | Matthews ........... H04L 47/6215 |
| 10,735,263 | B1 | 8/2020 | Mcalary |
| 10,742,554 | B2 | 8/2020 | Deb |
| 11,196,591 | B2 | 12/2021 | Hira |
| 11,374,794 | B2 | 6/2022 | Hira |
| 2016/0241463 | A1 * | 8/2016 | D'Souza ............... H04L 45/021 |
| 2017/0214623 | A1 * | 7/2017 | Finkelstein ......... H04L 41/5025 |
| 2018/0278512 | A1 * | 9/2018 | Olofsson ............. H04L 41/0894 |
| 2021/0320817 | A1 | 10/2021 | Janakiraman |
| 2022/0321469 | A1 * | 10/2022 | Qian ................... H04L 12/4633 |
| 2023/0114774 | A1 * | 4/2023 | Santuka ............... H04L 63/107 |
| 2023/0283546 | A1 | 9/2023 | Krishnan |
| 2023/0337113 | A1 | 10/2023 | Trujillo |
| 2024/0195725 | A1 * | 6/2024 | Rajamanickam ....... H04L 45/20 |

* cited by examiner

*Primary Examiner* — Johnny B Aguiar
(74) *Attorney, Agent, or Firm* — Robert C. Kowert; Kowert, Hood, Munyon, Rankin & Goetzel, P.C.

(57) ABSTRACT

A traffic manager obtains (a) a representation of an association between a set of networking destinations and a routing option group, and (b) a policy for selecting routing options from the group for network packets. For a network packet directed to one of the destinations, the traffic manager selects one of the routing options of the group based on the policy, and causes the packet to be transmitted to the destination along a path. The path includes, as a next-hop address, a network address associated with the selected routing option.

20 Claims, 11 Drawing Sheets

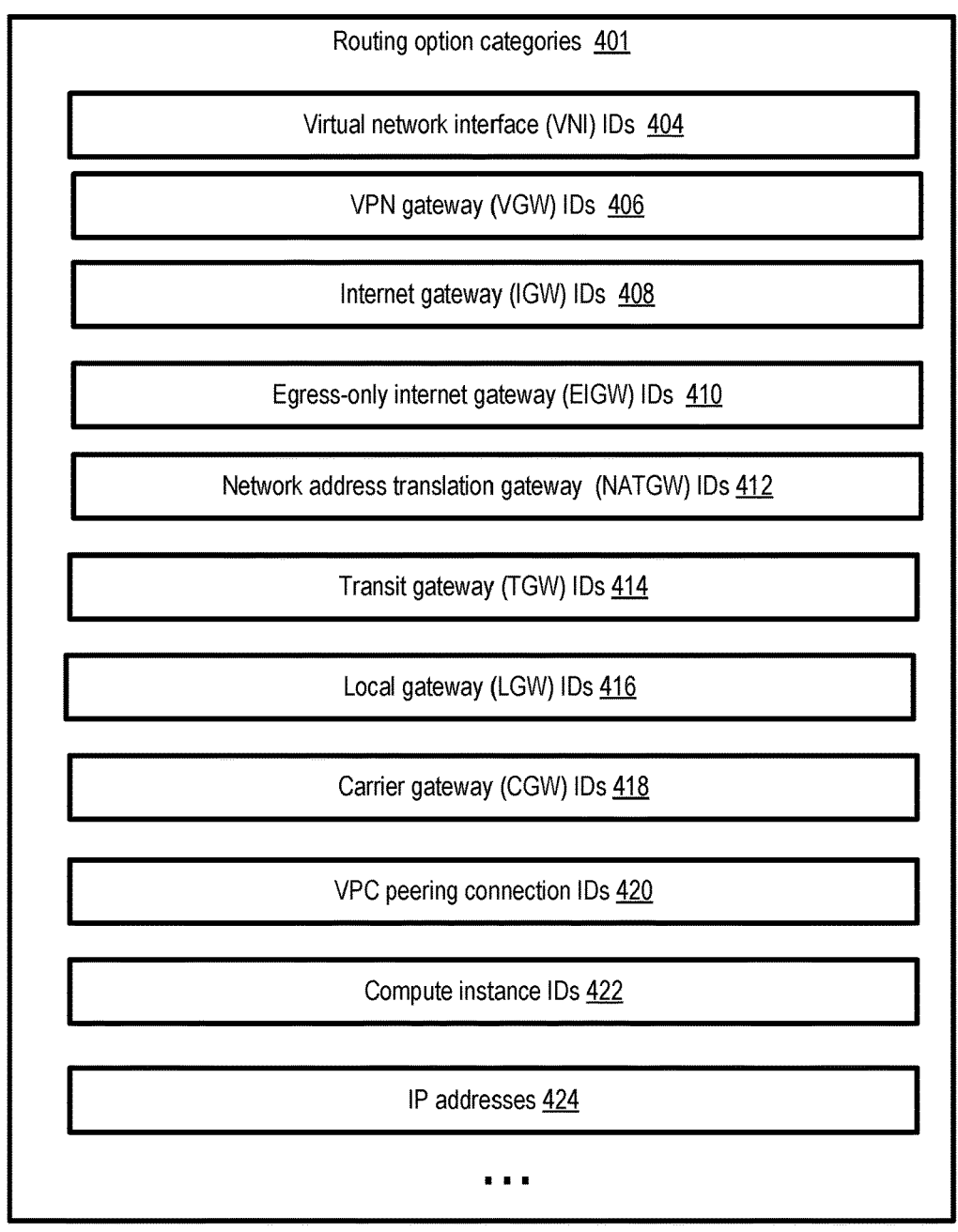

Routing option categories 401

Virtual network interface (VNI) IDs 404

VPN gateway (VGW) IDs 406

Internet gateway (IGW) IDs 408

Egress-only internet gateway (EIGW) IDs 410

Network address translation gateway (NATGW) IDs 412

Transit gateway (TGW) IDs 414

Local gateway (LGW) IDs 416

Carrier gateway (CGW) IDs 418

VPC peering connection IDs 420

Compute instance IDs 422

IP addresses 424

• • •

Routing option groups (ROGs) 450 comprising multiple routing options of different categories (or multiple options of the same category), along with corresponding option selection policies, can be specified/defined by VCS clients via programmatic interfaces, and included in route table entries

ROG 450A

VNI ID A, VNI ID B, VNI ID C

ROG 450B

VGW ID K, VPC Peering Conn ID L

Figure 5:
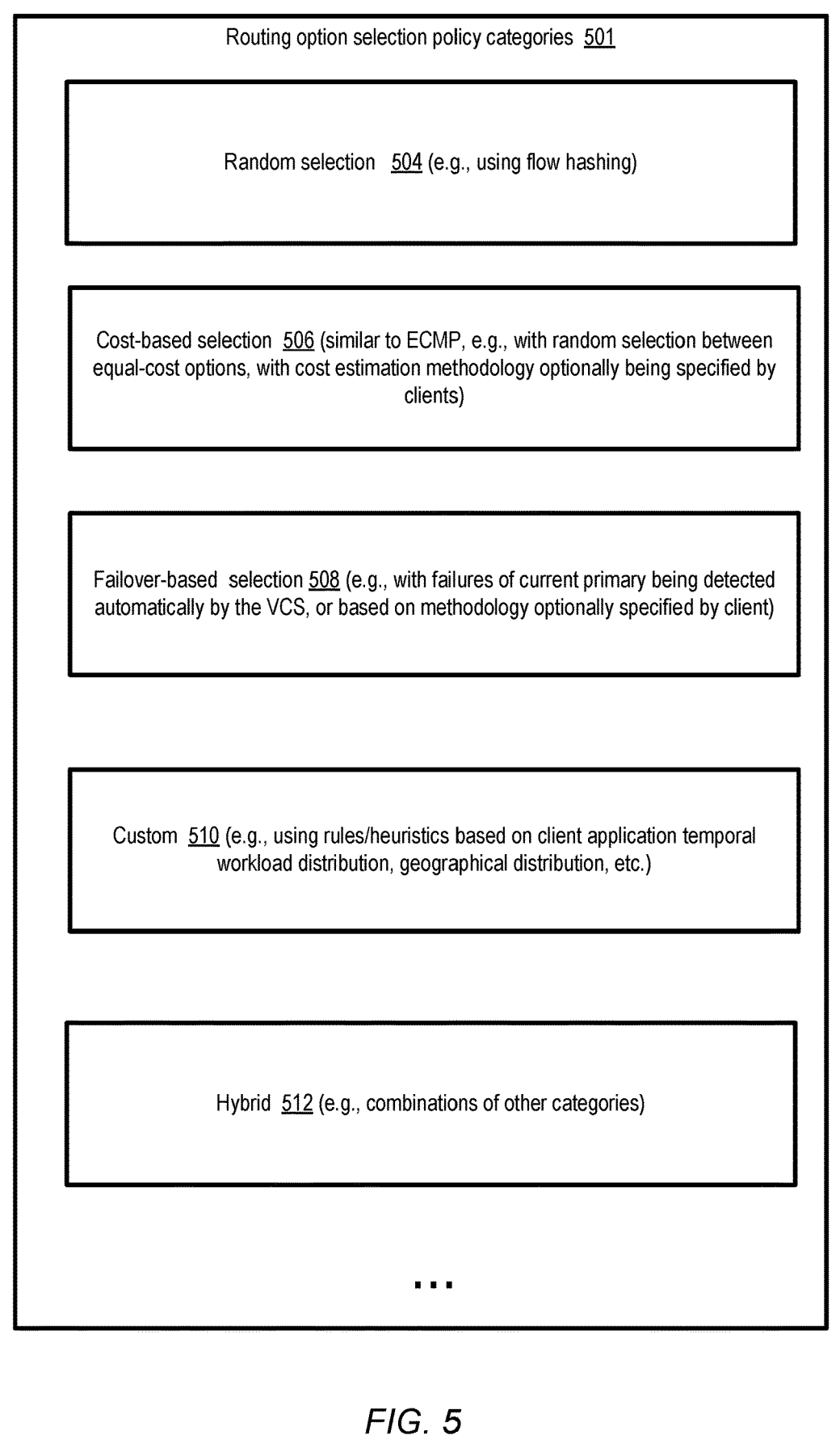

Routing option selection policy categories 501

Random selection  504 (e.g., using flow hashing)

Cost-based selection  506 (similar to ECMP, e.g., with random selection between equal-cost options, with cost estimation methodology optionally being specified by clients)

Failover-based  selection 508 (e.g., with failures of current primary being detected automatically by the VCS, or based on methodology optionally specified by client)

Custom  510 (e.g., using rules/heuristics based on client application temporal workload distribution, geographical distribution, etc.)

Hybrid  512 (e.g., combinations of other categories)

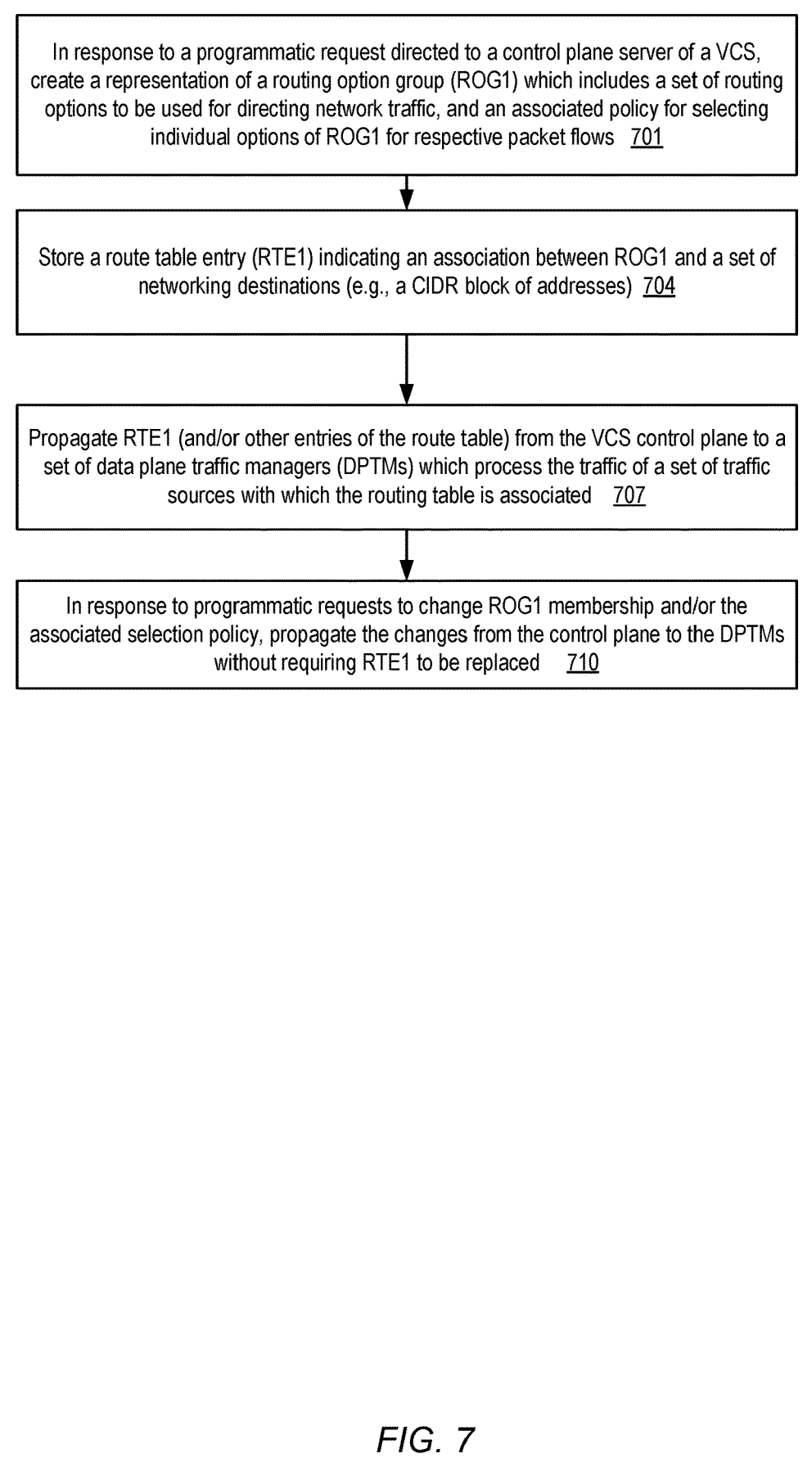

In response to a programmatic request directed to a control plane server of a VCS, create a representation of a routing option group (ROG1) which includes a set of routing options to be used for directing network traffic, and an associated policy for selecting individual options of ROG1 for respective packet flows  701

Store a route table entry (RTE1) indicating an association between ROG1 and a set of networking destinations (e.g., a CIDR block of addresses)  704

Propagate RTE1 (and/or other entries of the route table) from the VCS control plane to a set of data plane traffic managers (DPTMs) which process the traffic of a set of traffic sources with which the routing table is associated  707

In response to programmatic requests to change ROG1 membership and/or the associated selection policy, propagate the changes from the control plane to the DPTMs without requiring RTE1 to be replaced  710

*FIG. 7*

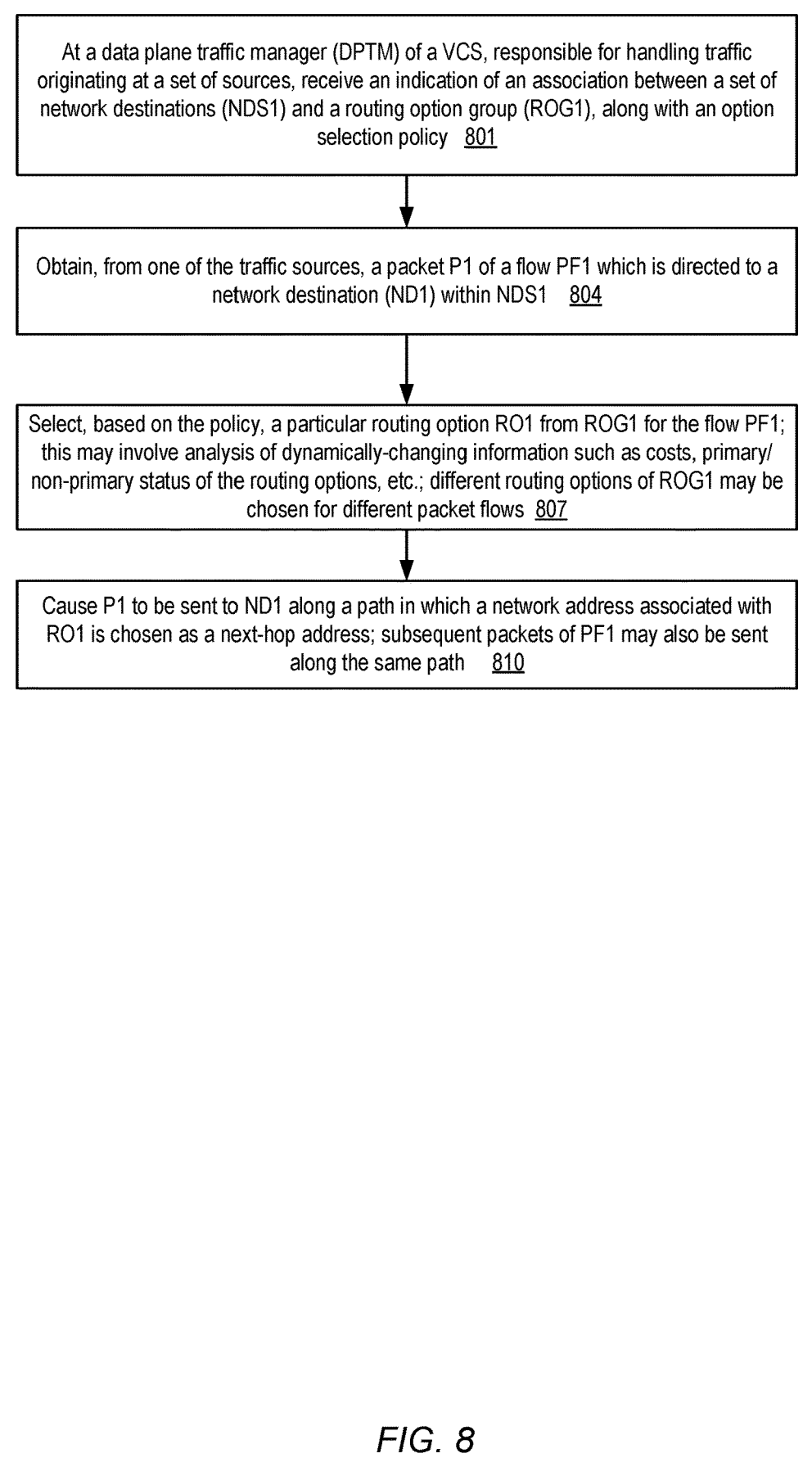

At a data plane traffic manager (DPTM) of a VCS, responsible for handling traffic originating at a set of sources, receive an indication of an association between a set of network destinations (NDS1) and a routing option group (ROG1), along with an option selection policy   801

$\downarrow$

Obtain, from one of the traffic sources, a packet P1 of a flow PF1 which is directed to a network destination (ND1) within NDS1   804

$\downarrow$

Select, based on the policy, a particular routing option RO1 from ROG1 for the flow PF1; this may involve analysis of dynamically-changing information such as costs, primary/ non-primary status of the routing options, etc.; different routing options of ROG1 may be chosen for different packet flows   807

$\downarrow$

Cause P1 to be sent to ND1 along a path in which a network address associated with RO1 is chosen as a next-hop address; subsequent packets of PF1 may also be sent along the same path   810

*FIG. 8*

CUSTOMER-SPECIFIED ROUTING OPTION GROUPS AND SELECTION POLICIES FOR CLOUD NETWORK TRAFFIC

BACKGROUND

As demand for virtualization-based services at cloud provider networks has grown, more and more networking and interconnectivity-related features have been added to the services. For example, isolated virtual networks referred to as virtual private clouds (VPCs) comprising virtual machines can be established on behalf of customers, a variety of logical gateways (such as Internet gateways for traffic between VPCs and the public Internet, virtual private network (VPN) gateways for traffic between VPCs and customer premises via VPN tunnels, and the like) can be set up, customer-specified route table entries can be created for VPCs, and so on. As the networking needs of customer applications continue to evolve, some customers of cloud provider networks may desire more flexible control over routing decisions for traffic of the applications.

BRIEF DESCRIPTION OF DRAWINGS

FIG. 4 illustrates example categories of routing options which may be included in customer-specified routing option groups, according to at least some embodiments.

FIG. 5 illustrates examples of routing option selection policies which may be specified by customers of a virtualized computing service, according to at least some embodiments.

FIG. 7 is a flow diagram illustrating aspects of operations, pertaining to routing option groups, which may be performed at a control plane of a network-accessible service of a cloud computing environment, according to at least some embodiments.

FIG. 8 is a flow diagram illustrating aspects of operations, pertaining to routing option groups, which may be performed at data plane traffic managers of a network-accessible service of a cloud computing environment, according to at least some embodiments.

Figure 1:
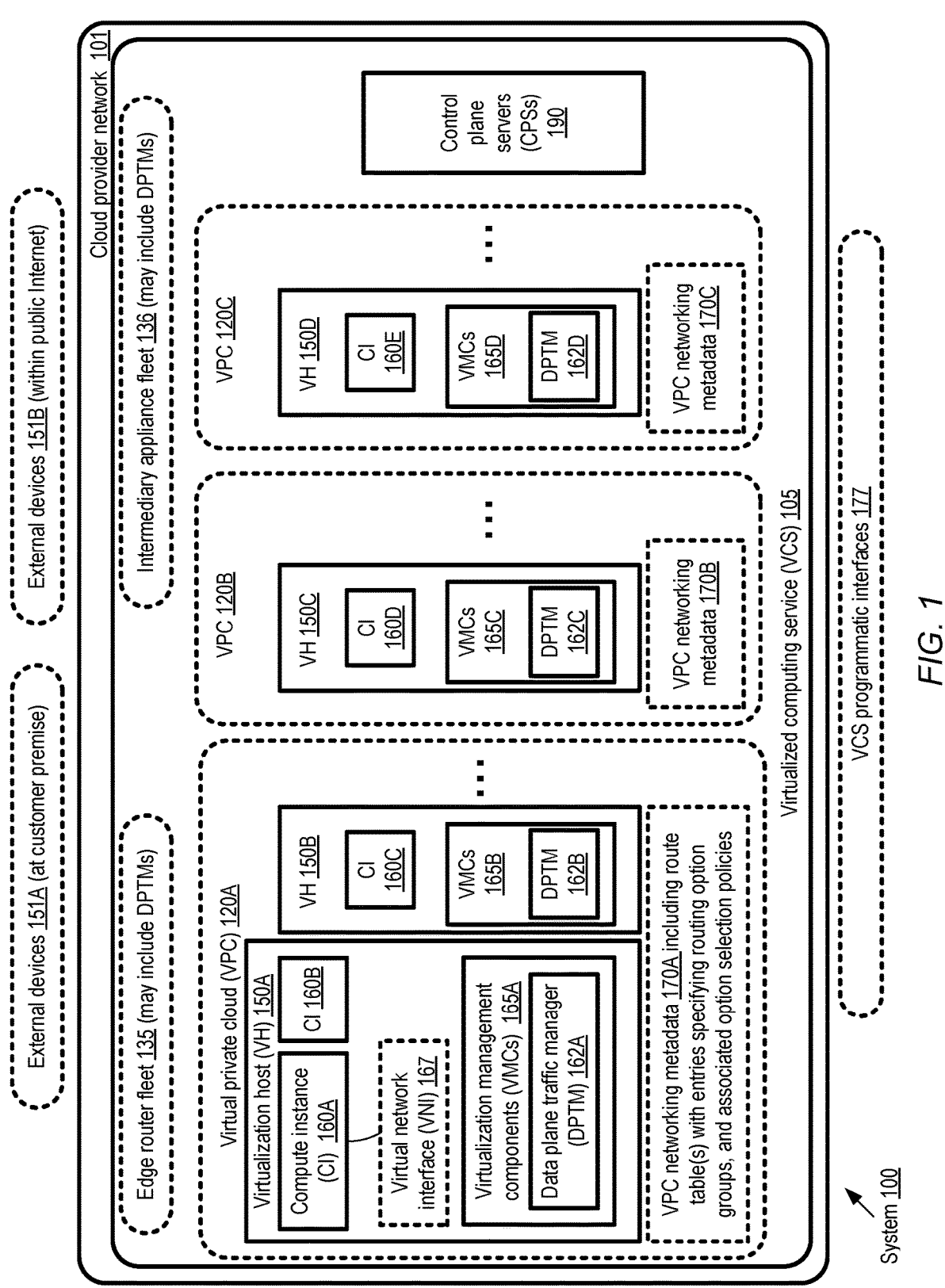
FIG. 1 illustrates an example system environment in which, at the request of customers of a virtualized computing service, routing option groups with associated option selection policies may be used for transmitting network traffic directed to specified sets of networking destinations, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

At virtualized computing services of cloud provider networks, route tables can be created for traffic associated with customer applications being run using the services. For example, a portion of a customer application can be run at virtual machines or compute instances within one virtual private cloud (VPC) established at the virtualized computing service (VCS), and route table entries can be created within a route table of the VPC to enable traffic to be routed from those compute instances to various groups of destinations, such as servers at premises external to the data centers of the cloud provider network, or compute instances in other VPCs. Conventionally, a given route table entry can include a set of networking destinations (e.g., specified using an Internet Protocol (IP) Version 4 (IPV4) or Version 6 (IPv6) Classless Inter-Domain Routing CIDR block, or specified using a single IP address) and a single routing option or target (e.g., a gateway, or a virtual network interface (VNI)) which can be used to select a next hop for traffic directed to those destinations from a set of sources for which the route table entry was created. VNIs are logical entities which can be assigned one or more network addresses and a set of other networking configuration properties, and which can be programmatically attached and detached from compute instances and other logical constructs of cloud provider networks to enable networking configuration portability and flexibility.

For some types of applications, VCS customers or clients may wish to allow the use of several distinct routing options for traffic to a given set of destinations represented in a routing entry, e.g., for failover-related reasons or for load balancing reasons, with the customers specifying customized rules that should be used by the VCS for choosing a particular routing option for a given packet flow. One conventional approach for supporting such objectives can involve the configuration of intermediary devices such as load balancers or other devices at which the customer-specified rules can be enforced. However, configuring such intermediaries can result in extra hops for the application traffic, which in turn can have a negative impact on application performance. Other approaches can include the use of the Border Gateway Protocol (BGP) or other similar dynamic routing protocols for managing failovers; such protocols have their own overheads (for example, BGP sessions have to be set up between BGP peers).

The present disclosure relates to methods and apparatus for enabling clients of a VCS to specify groups of alternative options for routing network traffic directed to a set of network destinations indicated in a given route table entry, and to programmatically indicate policies for selecting among the alternatives. The policies can then be enforced by the same traffic manager components of the VCS (e.g., networking virtualization managers running at virtualization hosts of the VCS) which would typically participate in the transfer of packets to/from compute instances or other resources used for customer applications, even if such routing option groups were not specified by the customers. No additional intermediaries such as load balancers or the like need to be set up in the proposed approach, and dynamic routing protocols such as BGP need not be used. A number of different categories of routing options can be combined within a given routing option group, such as VNIs, Internet Gateways (logical gateways that transfer packets to/from the public Internet), Virtual Private Network (VPN) gateways (logical gateways used for VPN traffic between VPCs and customer-premise devices outside the cloud provider network), identifiers of Inter-VPC peering connections, individual IP addresses assigned to customers' networking appliances, and the like.

The routing option groups (ROGs) can be treated as first-class VCS logical objects which are customer-visible. For example, customers can be provided programmatic interfaces (such as application programming interfaces or APIs) that can be used to create, view, modify or delete ROGs, and/or to create, view modify or delete route table entries which specify ROGs instead of single routing options for traffic directed to a set of destinations. A variety of policies can be specified by the customers for selecting individual routing options from an ROG for a given packet or a given packet flow, including failover-based policies, random selection policies, cost-based policies similar to Equal Cost Multi-Pathing (ECMP), or customized policies which employ application-specific logic. A given policy can be associated with a single ROG or with multiple ROGs. A given ROG can be included in several different route table entries. The policies themselves can also be treated as first-class objects, with programmatic interfaces available for creation, viewing, modifying or deleting them. Customers can be provided metrics collected by the VCS or other services of the cloud provider network pertaining to individual routing options of an ROG—e.g., the number and/or rate of packets transmitted using respective options may be indicated via such metrics. Customers can, if desired, specify security rules (similar to firewall rules or security groups) for an ROG as a whole, which can then be applied for all the options of the ROG. A routing option can also be referred to as a routing object identifier, a next-hop selection option, a routing target, or a route target. An ROG can also be referred to as a route cluster.

As one skilled in the art will appreciate in light of this disclosure, certain embodiments may be capable of achieving various advantages, including some or all of the following: (a) providing enhanced flexibility, control and visibility to VCS customers regarding application traffic routing, and (b) ensuring that the routing and forwarding of the application traffic can be adapted quickly to changing conditions, e.g., in the event of networking failures, without sacrificing performance or requiring the use of high-overhead dynamic routing protocols or intermediary devices.

The traffic and operations of a cloud provider network (or individual services of the cloud provider network, including a VCS) or cloud computing environment may broadly be subdivided into two categories: control plane operations carried out over a logical control plane and data plane operations carried over a logical data plane. While the data plane represents the movement of user data or application data through the distributed computing system, the control plane represents the movement of control signals through the distributed computing system. The control plane generally includes one or more control plane components distributed across and implemented by one or more control plane servers. Control plane traffic generally includes administrative operations, such as system configuration and management (e.g., resource placement, networking configuration, hardware capacity management, diagnostic monitoring, or system state information). The data plane includes customer resources that are implemented on the cloud provider network (e.g., compute instances, software containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components may share the virtualized servers with the data plane, and control plane traffic and data plane traffic may be sent over separate/distinct networks.

According to some embodiments, a system may include one or more control plane servers (CPSs) of a cloud computing environment, and one or more data plane traffic managers (DPTMs) of the cloud computing environment. A CPS may be configured to receive, via one or more programmatic interfaces from a client of the cloud computing environment, (a) a request to create, for network traffic directed to a set of destinations identified by a classless inter-domain routing (CIDR) block, a routing option group (ROG) comprising a plurality of routing options and (b) a policy to select, for a particular packet flow of the network traffic directed to the set of destinations, a particular routing option from the ROG. The ROG may include, for example, respective identifiers of a first virtual network interface (VNI) and a second VNI. In some cases, the CIDR block may include at least a first address within a virtual private cloud (VPC) of the cloud computing environment. The CPS may store, in a route table of the cloud computing environment, an entry indicating an association between the set of networking destinations and the ROG in various embodiments: for example, the set of networking destinations may be indicated in one column or field of the entry, while the ROG may be indicated (e.g., by an ROG identifier) in another column or field. The CPS may propagate an indication of the entry and the policy to one or more of the DPTMs. In some cases in which the route table comprises multiple entries, some of which may contain ROGs with multiple routing options while others may indicate single routing options, partial or full content of several or all of the entries may be propagated to the DPTMs. In response to a query received via the one or more programmatic interfaces, in some embodiments, a CPS may present, to the client, a representation of the ROG that was created and stored in the route table entry on behalf of the client, and/or the associated policy that was specified by the client.

A DPTM, which may for example comprise one or more processes or threads of execution running at a virtualization management component (VMC) of a virtualization host (VH) of the cloud computing environment, or at an edge networking device (such as an edge router) of the cloud computing environment, may use the ROG-containing route table entry and policy that it received from the CPS to direct packets of various data plane packet flows in some embodiments. A given packet flow may be distinguished from other packet flows based on a tuple comprising at least a source network address (e.g., an IP address of a source of network packets), a source port, a destination network address (e.g., an IP address of a destination of the network packets), a destination port, and an identifier of the networking protocol being used (e.g., IP) in various embodiments. The DPTM may select, based at least in part on the route table entry (or the ROG contained in the route table entry) and the policy, a particular routing option (such as a first VNI of several VNIs of the ROG) as the routing option to be used for one or more network packets of a first packet flow directed to a first destination of the set of destinations indicated in the entry. The DPTM may cause a first network packet of the first network flow to be transmitted to the first destination via a first path which includes, as a next-hop address of a device used for the path, a first network address associated with the routing option selected for the first packet flow. For example, the first network address may comprise an IP address assigned to the first VNI. In scenarios in which a logical gateway is selected as the routing option, a network address associated with the gateway (e.g., an address assigned to a particular VNI which is programmatically attached to a compute instance which implements the logic of the gateway) may be used as the next-hop address. Similarly, in various embodiments, the DPTM may select, based at least in part on the same route table entry (or the ROG contained in the route table entry) and the policy, a different routing option (such as a second VNI) as the routing option to be used for packets of a second packet flow directed to the first destination. The DPTM may cause a second network packet of the second packet flow to be transmitted to the first destination via a second path which includes, as a next-hop address, a second network address associated with the routing option selected for the second packet flow.

In at least some embodiments, the DPTMs may implement an encapsulation protocol of the cloud computing environment when transmitting network packets. Virtualized components of the cloud computing environment, such as compute instances or their attached virtual network inter-faces, may be assigned addresses within an overlay network of the cloud computing environment. An underlying physical network, referred to as a substrate network, may be used to transfer packets to/from the physical devices (e.g., virtualization hosts) at which the virtualized components run. In accordance with the encapsulation protocol, the DPTMs may incorporate the packets generated at the virtualized components (which use addresses within the overlay network) within encapsulation packets (which use addresses within the substrate network), and transmit the encapsulation packets via the substrate network towards the physical devices which are to be used to convey the packets to their intended destinations.

In at least some embodiments, an ROG whose identifier or constituent options are stored within a route table entry on behalf of a client can be modified based on programmatic requests from the client, without having to replace the route table entry itself. For example, for a set of networking destinations ND1, an ROG with identifier ROG1, comprising VNIs VNI1 and VNI2, may initially be created and added to a route table entry RTE1. A policy Poll may be specified programmatically by the client for selecting among the VNIs of ROG1 for various packet flows. RTE1 may include the identifier ROG1 in some implementations. Later, the client may wish to add a third VNI VNI3 to ROG1, or delete VNI1 or VNI2. Such ROG modifications may be made by the client by sending programmatic requests to the control plane servers; the client need not modify or replace the route table entry RTE1, or disassociate ROG1 from ND1. Based on the requested changes to ROG1 and/or changes requested with respect to the policy, the appropriate VNI may be chosen for subsequent network packet flows by DPTMs in various embodiments.

As indicated earlier, combinations of one or more categories of routing options may be included within an ROG in some embodiments. Such routing option categories may include, for example, VNIs, gateways of various kinds including Internet gateways, VPN gateways and the like, private network endpoints, VPC peering connection identifiers, and so on. A private network endpoint may enable packets to be conveyed between (for example) compute instances within a given VPC and a publicly-accessible service of the cloud computing environment (such as a database service or a storage object service) without traversing the public Internet or exiting the internal network of the cloud provider. A VPC peering connection is a networking connection between two VPCs that enables traffic to be routed between them using private IPv4 addresses or IPv6 addresses. Instances in either VPC can then communicate with each other as if they are within the same network.

A number of different types of option-selection policies may be supported for ROGs in some embodiments. According to some policies, flow hashing may be used for selecting routing options. For example, a hash function may be applied to various elements of a flow identifier (such as the source and destination network addresses and ports), and the resulting value (referred to as a flow hash value) may be mapped (e.g., using a modulo function) to an index corresponding to one of the options of the ROG. In some cases, respective cost metrics (e.g., metrics based on expected latencies or based on available bandwidth) may be assigned to individual routing options of an ROG, and the costs of the different options may be compared in accordance with a client-specified policy, with the lowest cost option (or one of the lowest cost options, if multiple options have the same lowest cost) being selected. In at least some embodiments, the client may use programmatic interfaces to specify a cost metric determination methodology (e.g., a program, a set of scripts, or a formula) to be used to compute the cost metrics, and the DPTMs or other components of the cloud computing environment may use the specified methodology to determine the cost metrics of the different options prior to making a selection for a given packet flow.

In some embodiments, a failover protocol may be implemented for the resources to which the traffic is to be distributed using an ROG. For example, as a default, one routing option (referred to as a primary routing option of the ROG) may cause the traffic from a set of traffic sources to be sent to a set of servers in a location L1. If there is a failure at L1 or along the network path to L1, a second routing option (referred to as a non-primary routing option) may be used to direct the subsequent traffic from that set of traffic sources to a different set of servers in a location L2. In such scenarios, the DPTMs may determine, based on a client-specified failover-based policy, whether a given routing option of the ROG is currently a primary routing option or a non-primary routing option with respect to failover. One of the primary routing options may then be used to transmit network flows towards their intended destinations. In at least one embodiment, a client may transmit an indication of a methodology to be used by the DPTMs to determine whether a given routing option is a primary or a non-primary routing option. In some embodiments, the client may use a programmatic interface to specify which of the routing options of an ROG are currently designated as primary and which are non-primary—as such, the client may dynamically change the status of a routing option from a primary to a non-primary and vice versa in such embodiments.

In at least one embodiment, a cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (AZ) (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, AZs within a region are positioned far enough away from one other that the same natural disaster should not take more than one AZ offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the AZs. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability. According to some embodiments, different routing options of a given ROG may be located within, or configured within, respective AZs. The associated option selection policy may be AZ-based—for example, for traffic originating at or directed to a first AZ AZ1, the policy may indicate that if the ROG contains a routing option in AZ1, that option should be chosen in preference to options that are not in AZ1. In order to enforce the option selection policy for a given packet or flow, in some embodiments the DPTMs may determine the AZ (if any) within which the source of the packet/flow is configured, the AZ (if any) within which the destination of the packet/flow is configured, and/or the AZ (if any) within which the routing options of the ROG are configured.

FIG. 1 illustrates an example system environment in which, at the request of customers of a virtualized computing service, routing option groups with associated option selection policies may be used for transmitting network traffic directed to specified sets of networking destinations, according to at least some embodiments. As shown, system 100 includes resources and artifacts of a virtualized computing service (VCS) 105 of a cloud computing environment or cloud provider network 101. The VCS may include control plane servers 190, an edge router fleet 135, an intermediary appliance fleet 136, and a collection of VPCs such as VPC 120A, VPC 120B and VPC 120C in the depicted embodiment. VPCs may also be referred to as isolated virtual networks or IVNs. A VPC may comprise a collection of networked resources (including, for example, virtual machines or compute instances) allocated to a given client of the provider network, which are logically isolated from (and by default, inaccessible from) resources allocated for other clients in other VPCs. The client on whose behalf a VPC is established may be granted substantial flexibility regarding network configuration for the resources of the VPC—e.g., private IP addresses for virtual machines may be selected by the client without having to consider the possibility that other resources within other VPCs may have been assigned the same IP addresses, subnets of the client's choice may be established within the VPCs, security rules may be set up by the client for incoming and outgoing traffic with respect to the VPC, route tables and route table entries may be added or deleted for VPCs, routing option groups with associated option selection policies may be created for route tables of the VPCs, and so on. At least a subset of the VPC configuration settings chosen by a client for a given VPC may be included in a VPC networking metadata store of the VCS.

In the example scenario shown in FIG. 1, VPC 120A includes compute instances (CIs) 160A and 160B run at a virtualization host (VH) 150A, and CI 160C run at VH 150B. VPC 120B (which may have been set up on behalf of the same VCS client as the client on whose behalf VPC 120A was set up, or on behalf of a different client) may include CI 160D on VH 150C, while VPC 120C may include CI 160E running on VH 150D. Individual ones of the VHs may include respective virtualization management components (VMCs) such as hypervisors in the depicted embodiment. For example, VH 150A may include VMCs 165A which include a data plane traffic manager (DPTM) 162A. Similarly, VH 150B may include VMCs 165B with DPTM 162B, VH 150C may include VMCs 165C with DPN 162C, and VH 150D may include VMCs 165D with DPTM 162D. In some embodiments, a DPTM of a VH may comprise one or more threads of execution which are responsible for managing networking virtualization tasks for compute instances running at the VH. In at least one embodiment, at least a subset of the VMCs of a VH may run at an offload card which has its own processors separate from the primary processors or CPUs of the VH, thereby enabling more of the computing capacity of the primary processors to be devoted to applications running at the compute instances of the VH. In one such embodiment, a DPTM may run on such an offload card. DPTMs may in effect bridge the gap, with respect to networking operations, between virtual networks such as VPCs on the one hand, and the underlying physical or substrate network of the VCS on the other hand. For example, DPTMs may implement an encapsulation protocol which is used to transfer packets, which use private network addresses assigned within VPCs as source and/or destination addresses, over the physical/substrate network which uses a different group of addresses that are not visible at the compute instances. In various embodiments, similar DPTMs may be run at edge routers of edge router fleet 135, and/or on appliances of intermediary appliance fleet 136. The appliances, which may also be referred to as middle-boxes, may be used for various purposes on behalf of VCS clients, such as for performing application-specific auditing or other security-related tasks.

Respective virtual network interfaces (VNIs) may be programmatically attached to CIs in the depicted embodiment to enable network packets to flow from and to the CIs. For example, VNI 167 is shown attached to CI 160A. VNIs (which may also be referred to as "elastic network interfaces" or ENIs) may be configured at a VCS, enabling networking-related attributes such as IP addresses to be transferred relatively easily between CIs without necessarily reconfiguring physical network cards. Such attribute transfers may be accomplished, for example, by detaching a VNI programmatically from one CI and attaching it programmatically to another CI. The networking-related attributes of a VNI may include, among others, a VPC identifier of the VPC within which the VNI is configured, one or more private or non-public IP addresses selected from a range of such addresses of the VPC, one or more public IP addresses which are advertised on and accessible from the public Internet, a subnet identifier, a Domain Name Service server responsible for propagating address(es) of the VNI, and so on.

In various embodiments, customers may configure various types of logical gateways (not shown in FIG. 1) for their VPCs—e.g., Internet gateways may be set up as intermediaries for traffic to and from external devices 151B of the public Internet, VPN gateways may be set up as intermediaries for traffic to and from external devices 151A at customer premises, and so on.

In at least some embodiments, a set of VCS programmatic interfaces 177 may be implemented by the VCS to enable clients to submit various kinds of requests or messages and receive corresponding responses. The programmatic interfaces may, for example, include one or more web-based consoles, command-line tools, graphical user interfaces, APIs and the like. Using the programmatic interfaces, clients may submit requests to establish or delete VPCs, to launch or terminate CIs, and so on. These types of administrative requests or messages may be processed, at least initially, by control plane servers (CPSs) 190 in the depicted embodiment.

The programmatic interfaces 177 may also be utilized by VCS clients to request the creation of routing option groups (ROGs) of the kind introduced earlier. For example, a CPS may receive a request, submitted by a client from a device such as a desktop or laptop, to create an ROG comprising a plurality of routing options, with a specified routing option selection policy. The policy may indicate logic or rules to be used to select, for individual packet flows or individual packets, the particular routing option of the ROG which is to be used to identify a next-hop destination. In some embodiments, the ROG creation request may indicate a VPC within whose route table entries the ROG is intended to be used. The routing options may include some combination of VNI identifiers, gateway identifiers, IP addresses, VPC-to-VPC peering connection identifiers and the like. The CPS may cause a route table entry which indicates an association between a set of network destinations and the ROG to be stored, e.g., as part of a data structure representing a route table entry stored in VPC networking metadata. For example, representations of ROGs that are going to be used for route tables of VPC 120A may be stored within VPC networking metadata 170A, representations of ROGs that are going to be used for route tables of VPC 120B may be stored within VPC networking metadata 170B of VPC 120B, and representations of ROGs that are going to be used for route tables of VPC 120C may be stored in VPC networking metadata 170C. In some embodiments, a regional or availability zone-level repository of networking metadata may be maintained, and the ROGs may be stored within such regional or zonal repositories instead of, or in addition to, being stored in per-VPC repositories. In various embodiments, ROGs may be treated as first class objects that can exist independently of route tables, even though they may be used within route table entries. In other embodiments, ROGs may be treated as constituent components of route table entries; in such embodiments, ROGs may only exist in the context of their "parent" route table entries.

In various embodiments, a CPS may propagate the route table entries, or encoded versions of the route table entries, to various DPTMs responsible for forwarding packets to/from the CIs 160. The CPSs may also respond to other types of programmatic requests pertaining to ROGs in the depicted embodiment—e.g., in response to queries received via programmatic interfaces 177 from clients, the routing options and/or associated policies of ROGs may be presented.

After a DPTM receives a representation of a route table entry containing an ROG, as well as the policy associated with that ROG for that route table entry, the DPTM may begin applying the policy. For example, in embodiments in which routing options are to be selected once for all the packets of a given packet flow, a DPTM may select a particular routing option from the ROG, according to the policy, when the first packet of the flow is detected at the DPTM. The selected option may then be used to transmit the packets of the flow towards their intended destinations—for example, a path which includes, as a next-hop address, a network address associated with the chosen routing option may be used. Depending on the details of the policy, different routing options may be chosen for respective packet flows between a given traffic source and a given traffic destination in some embodiments. In some embodiments, the routing options may be selected at a different granularity than per packet flow—for example, routing options may be selected on a per packet basis.

The programmatic interfaces 177 may be utilized by VCS clients to modify ROGs or routing option selection policies, without having to modify or replace the route table entries in various embodiments. For example, a client may add routing options, delete routing options, or change the rules or logic to be used to select routing options from an ROG. After the changes are accepted at the VCS control plane, the new set of entries and/or the new policy may be used to select routing options for subsequent packets or packet flows.

Any of a variety of categories of routing options and option selection policies may be used in different embodiments. For example, the routing options may include VNIs, gateways of various types, private network endpoints, VPC peering connection identifiers, and/or public or non-public IP addresses in some embodiments. The implementation of option selection policies may involve using flow hashing, using cost metrics associated with the respective options of an ROG, using failover-related primary versus non-primary designations of the routing options, and/or using custom logic provided by the client. In some cases, as discussed further below in the context of FIG. 2, the policies selected by clients may utilize information about availability zones or regions in which the routing options are configured to choose the appropriate routing option from an ROG.

Figure 2:
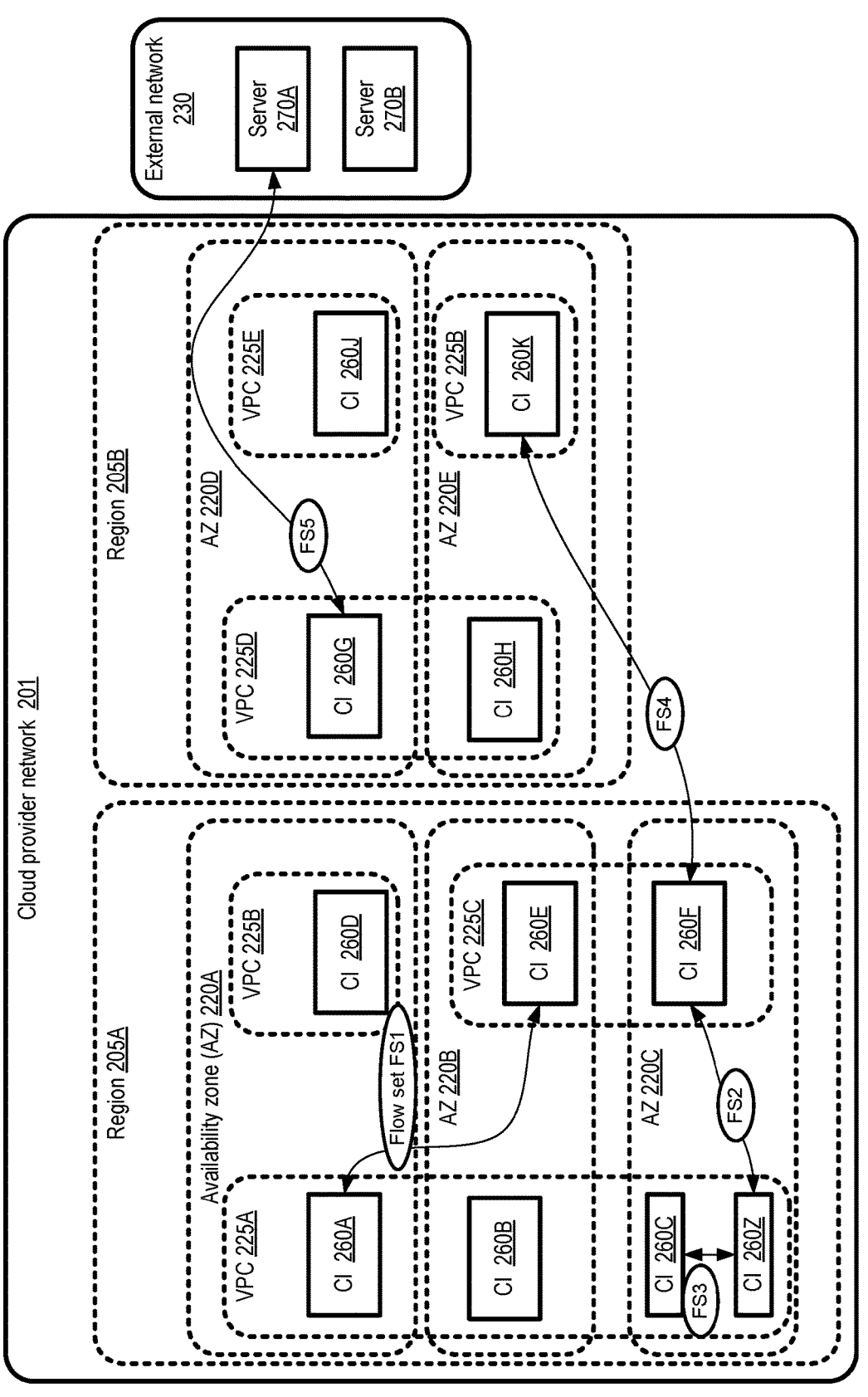
FIG. 2 illustrates examples of packet flow sets for which routing decisions may be managed using routing option groups, according to at least some embodiments.

FIG. 2 illustrates examples of packet flow sets for which routing decisions may be managed using routing option groups, according to at least some embodiments. The resources of a VCS (and/or other network-accessible services) of cloud provider network 201 may be distributed among several regions, such as regions 205A and 205B in the depicted embodiment, with each region comprising some number of data centers. As indicated earlier, regions may in turn be divided into availability zones (AZs) 220. An AZ is an isolated failure domain including one or more data center facilities with separate power, separate networking, and separate cooling from those in other AZs. In various embodiments, AZs may be defined in such a way that if an application is implemented using resource spread across more than one AZ, the application would continue to function in at least one AZ even if large-scale events such as tornados, earthquakes and the like disrupt operations in a given AZ.

In the scenario depicted in FIG. 2, application components running at compute instances (CIs) 260 set up in various VPCs 225 may need to communicate with one another, and/or with application components running at servers 270 configured within external networks 230 (e.g., networks set up at premises of customers of the cloud provider network). In region 205A, VPC 225A may comprise CIs 260A, 260B, 260C and 260Z, distributed among AZs 220A, 220B and 220C. In some embodiments, a VPC may be organized as a collection of subnets, with individual subnets configured within a given AZ (e.g., a subnet may not span multiple AZs). In such an embodiment, CI 260A may be in one subnet of VPC 225A, CI 260B may be in a second subnet, and CIs 260C and 260Z may be in a third subnet. Some VPCs need not cross AZ boundaries—for example, VPC 225B comprising CI 260D may be configured entirely within AZ 220A. VPC 225C may comprise CIs 260E and 260F. In region 205B, VPC 225D may include CIs 260G (in AZ 220D) and 260H (in AZ 220E). VPC 225E may include CI 260J and VPC 225B may include CI 260K. External network 230 may include servers 270A and 270B. A given client or customer of the cloud provider network may request the establishment of one or more VPCs in various regions and/or AZs.

Using the kinds of routing options introduced earlier, packet flows between sources and destinations in various VPCs, AZs, regions and external networks may be managed based on customer-specified option selected policies in the depicted embodiment. A given packet flow may be distinguished from other packet flows based on the combination of at least the network protocol (e.g., Transmission Control Protocol or TCP) being used, the source address (e.g., an IPv4 or IPv6 address), the source port, the destination address, the destination port in some embodiments. The network addresses may be public addresses (accessible from and/or advertised to, the public Internet) or private addresses (addresses which are visible by default only within a VPC) in some embodiments. Example packet flow set FS1 of FIG. 2 may include packets being transmitted within a given region 205A, across VPC boundaries and across AZ boundaries, between CI 260A and CI 260E. Example flow set FS2 may include packets being sent between VPCs within the same AZ. Example flow set FS3 may include packets between transmitted between CIs of the same VPC in the same AZ. Example flow set FS4 may include packets sent across regions, while example flow set FS5 may include packets transmitted between a cloud provider network region and an external network. Using routing option groups, any customer-desired combination of such flow sets may be managed using a single route table entry in various embodiments. Different routing options may be included in an ROG in some embodiments, depending on where (in terms in regions, AZs, VPCs and external networks) the sources and destinations of the traffic are; for example, to handle traffic between a VPC and an external network, a VPN gateway identifier may be used as one routing option, and to handle traffic between two VPCs for which a peering connection has been set up, the identifier of the peering connection may be used.

Figure 3:
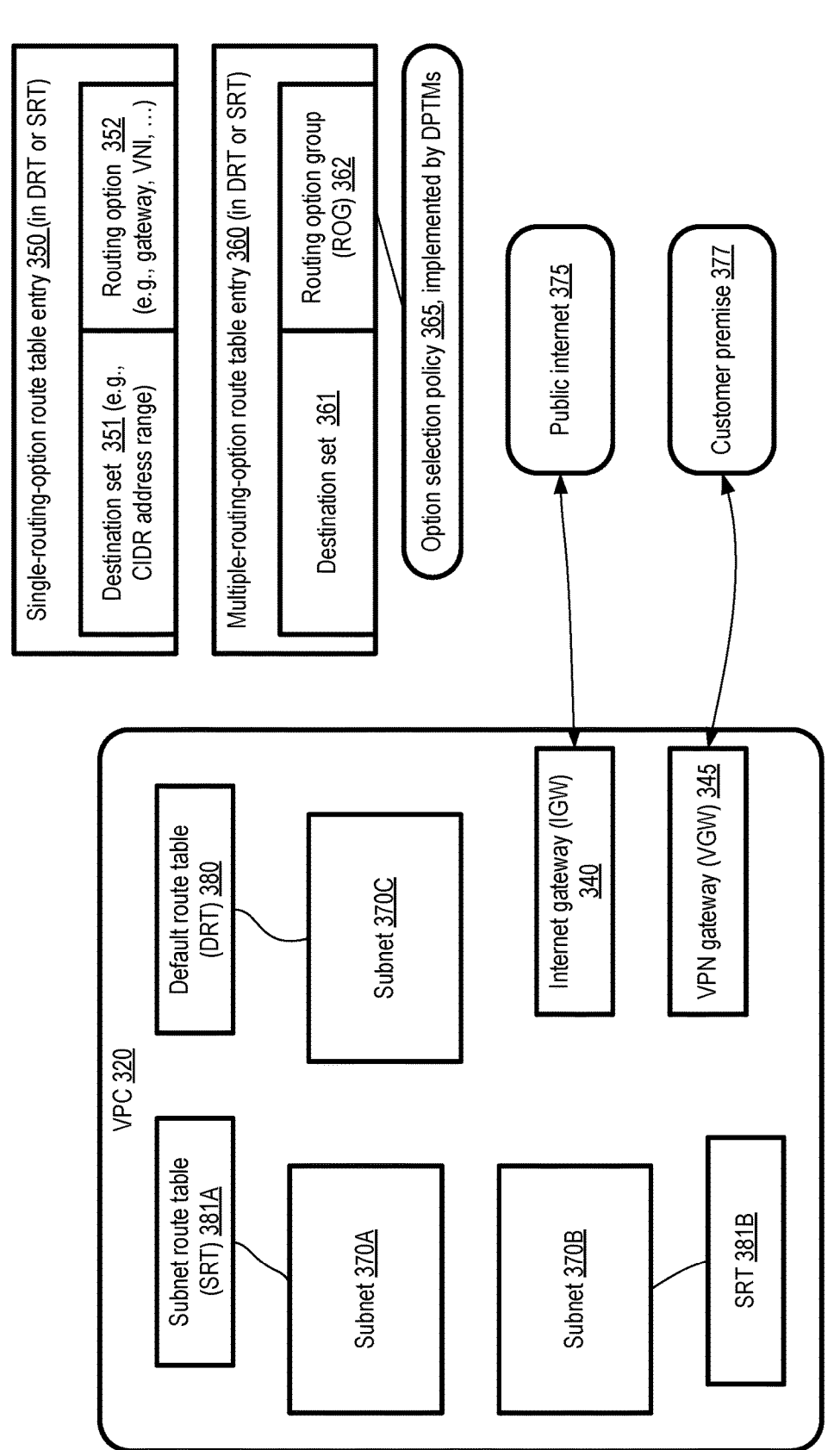
FIG. 3 illustrates example types of route table entries which may be created for a virtual private cloud of a virtualized computing service, according to at least some embodiments.

FIG. 3 illustrates example types of route table entries which may be created for a virtual private cloud of a virtualized computing service, according to at least some embodiments. In at least some embodiments, a default route table (DRT) 380 may be created for a VPC 320, e.g., at the time that the VPC itself is created in response to a programmatic request from a client of a VCS. A number of subnets may be configured within the VPC, each specified by one or more CIDR blocks. For example, subnets 370A, 370B and 370C may be set up in response to programmatic requests from the client on whose behalf VPC 320 was established. To direct the traffic originating within each subnet (e.g., from compute instances whose attached VNIs are assigned addresses within the subnet) to various destinations, a route table may be associated with or assigned to the subnet at the client's request in various embodiments. For example, subnet 370A may be associated with subnet route table (SRT) 381A, and subnet 370B may be associated with route SRT 381B. If the client does not request the association of a specific route table with a particular subnet, the DRT of the VPC may be associated with that subnet in some embodiments—for example, DRT 380 may be associated with subnet 370C.

Clients may also request the establishment of logical gateways for various kinds of VPC traffic in the depicted embodiment. For traffic to/from addresses of the public Internet 375, an Internet gateway 340 may be created at client request (or by default) in some embodiments. A VPN gateway 345, used for transmitting and/or receiving traffic to/from a customer premise 377 may be set up in response to a programmatic request. Each of the logical gateways may be assigned a respective identifier by the VCS control plane. The gateways may be described as "logical" in the depicted embodiment because they may be implemented using VCS-provided software running, for example, at general-purpose virtual machines selected and managed by the VCS control plane, and may not use dedicated networking hardware devices.

Individual ones of the route tables of the VCS (e.g., the DRT and the SRTs) may comprise one or more entries in the depicted embodiment. At least two types of route table entries may be supported at the VCS in some embodiments: single-routing-option route table entries, such as entry 350, and multiple-routing-option route table entries such as entry 360. Both types of route table entries may indicate a set of networking destinations for which the routing information is being provided, such as destination set 351 or destination set 361. In a single-routing-option entry, as suggested by the name, one routing option 352 may be indicated for traffic directed to the destination set 351. In a multiple-routing-option entry, a routing option group (ROG) 362 which has an associated option selection policy 365 may be indicated for traffic directed to the corresponding destination set 361. The option selection policy may indicate the logic which is to be used (e.g., at DPTMs of the kind indicated earlier) to select, for individual packet flows or for individual packets, which particular route option of the ROG should be used to determine the next hop (or multiple next hops) along the path to the intended destination. The client on whose behalf the VPC is established may be able to view both kinds of route table entries in response to programmatic requests in at least some embodiments. Note that a given DRT or SRT may comprise only single-routing-option entries in some cases, only multiple-routing-option entries in other cases, or a mix of single-routing-option and multiple-routing-option entries in yet other cases. In at least one embodiment, route tables may also be associated programmatically with VPC gateways such as Internet gateways or VPN gateways, and not just with subnets. In some embodiments, a route table entry which initially contains a single routing option may be modified, in response to programmatic input from the client on whose behalf the entry was created, such that the modified version includes an ROG instead of the single routing option. In one embodiment, single-routing-option route table entries may be treated as though they included an ROG which currently happens to contain just one routing option; as such, all route table entries may be assumed to contain ROGs in such an embodiment.

FIG. 4 illustrates example categories of routing options which may be included in customer-specified routing option groups, according to at least some embodiments. As shown, routing option categories 401 whose examples or instances can be combined in individual ROGs may include VNI IDs (identifiers) 404, VPN gateway (VGW) IDs 406 Internet gateway (IGW) IDs 408, Egress-only internet gateway (EIGW) IDs 410, network address translation gateway (NATGW) IDs 412, transit gateway (TGW) IDs 414, local gateway IDs 416, carrier gateway IDs 418, VPC peering connection ODs 420, compute instance IDs 422 and/or IP addresses 424. Individual routing options belonging to such categories may also be indicated in single-routing-option route table entries of the kind shown in FIG. 3.

As mentioned earlier, virtual network interfaces (VNIs) are logical entities which can be assigned one or more network addresses and a set of other networking configuration properties, and which can be programmatically attached and detached from compute instances and other logical constructs of cloud provider networks to enable networking configuration portability and flexibility. Each VNI may be assigned a respective identifier which can be indicated as a routing option by a VCS customer.

To enable compute instances, set up within a VPC of a client, to communicate securely via VPN tunnels (e.g., using IPSec (Internet Protocol Security) or similar protocols) to resources in a premise of the client, a VGW may be established and included as a routing option in at least one route table of the VPC in various embodiments.

An IGW is a horizontally-scaled, redundant, and highly available VPC component that allows communication between a VPC and the public Internet, e.g., using IPV4 and/or IPv6. AN IGW enables compute instances or other resources within a VPC (e.g., if a VNI of the resource is assigned a public IPv4 address or an IPv6 address) to connect to the Internet, and resources of the Internet to connect to resources within the VPC. For example, an IGW may be used to enable a client to connect to a VCS compute instance from a local computer outside the cloud provider network, if the local computer has Internet access.

In some cases, a VCS client may wish to enable compute instances in a private subnet (e.g., a subnet which does not have a direct route to an IGW) of a VPC to initiate outbound communication with the public Internet, but prevent devices on the public Internet from initiating connections with the compute instances in the VPC. An egress-only internet gateway (EIGW) may be configured for the VPC at the request of the client to support this type of functionality in some embodiments.

A network address translation gateway (NATGW) may be set up at client request to enable compute instances in a private subnet of a VPC to connect to services outside the VPC, while preventing such services from initiating connections to the compute instances.

For some types of client applications, a hub-and-spoke networking architecture may be desired, with resources in several spoke networks (such as VPCs or on-premise networks) communicating with one another via a virtual traffic hub set up at the provider network. Such virtual traffic hubs may be referred to as transit gateways (TGWs) in various embodiments, and identifiers of TGWs may also be used as routing options in at least some embodiments.

In some embodiments, a VCS may implement functionality referred to as an "extensions" or "outposts" service, whereby cloud provider network infrastructure (such as VPCs), APIs and tools can be extended to customer premises. By providing local access to provider network-managed infrastructure, outposts services enable clients to build and run applications on premises using the same programming interfaces that are available within the regions of the provider network, while using local compute and storage resources for lower latency and local processing needs. VPC technologies, including subnets, can be used at the customer premises with the help of the outposts service. A client can set up a local gateway (LGW) to enable connectivity between outpost subnets and local on-premises networks in some embodiments, and the identifiers of such LGWs can be incorporated within ROGs.

For some types of applications, VCS clients may require connectivity to networks of telecommunication service providers or "carriers". To enable to and from such carrier networks at a VPC, a carrier gateway (CGW) may be established on client request. For example, a CGW may perform network address translation of compute instances within a VPC to a set of carrier IP addresses chosen from a pool of addresses selected specifically for the carrier. In some cases, special cloud provider network infrastructure deployments that embed compute and storage services within the telecommunication service providers' data centers at the edge of a 5G (fifth generation) radio-based application technology networks may be set up to facilitate communication between compute instances and the carrier networks using CGWs.

VPC peering connections may be set up at client request in some embodiments to route traffic between private addresses in a pair of VPCs (in the same region, or in different regions), as though the compute instances of both VPCs were configured within the same network. Each such peering connection may be assigned an identifier which can be used as a routing option.

In some embodiments, identifiers of individual compute instances of the VCS may be used as routing options if desired. In at least one embodiment, IP addresses (e.g., IPv4 or IPv6 addresses) of logical constructs or physical devices may be chosen as routing options. Other categories of routing options than those shown in FIG. 4 may be supported by a VCS in some embodiments.

Routing option groups (ROGs) 450 comprising one or more routing options of different categories (or the same category) may be set up in response to programmatic requests from clients in various embodiments. For each such ROG, a corresponding option selection policy may also be specified. The ROGs may then be included in route table entries, e.g., in response to further programmatic requests from clients, for various route tables maintained by the VCS. Example ROG 450A includes three VNI IDs A, B and C, while ROG 450B includes a VGW ID K and a VPC peering connection ID L.

In some embodiments, the provider network or the VCS may only permit certain combinations of routing option categories to be included in ROGs, instead of permitting combinations of any of the categories shown in FIG. 4. In at least one embodiment, the provider network may permit only up to a particular number of routing options to be included in an ROG; in other embodiments, a client may include any desired number (greater than or equal to one) of routing options in an ROG. In response to programmatic requests, in various embodiments a client may be provided an indication of the routing option categories which can be combined to define ROGs, and/or the maximum number of routing options permitted per ROG.

FIG. 5 illustrates examples of routing option selection policies which may be specified by customers of a virtualized computing service, according to at least some embodiments. As indicated earlier, in various embodiments the routing selection policies may indicate the logic which is to be used to select the appropriate routing option from the one or more routing options included within an ROG, when deciding how packets are to be transmitted to a network destination with which the ROG is associated in a route table entry. Routing option selection policy categories 501 supported at a cloud provider network may include random selection 504, cost-based selection 506, failover-based selection 508, custom 510 and/or hybrid 512 in some embodiments.

If a client specifies a random selection policy 504 for a given ROG, in some embodiments flow hashing may be implemented at the DPTMs to select the option which is to be used for a given packet or for a given packet flow. In flow hashing, the fields or headers that are used to identify a packet flow (e.g., the protocol, source and destination network addresses, and source and destination ports) may be provide as input to a hash function, and the value generated as the output of the hash function may be mapped to an integer index which identifies the selected routing option. For example, if the ROG includes routing options RO1, RO2 and RO3, the indices 0, 1 and 2 may be assigned to the routing options, and the hash function output H1 generated for a particular packet flow PF1 may be mapped to the one of the indices using the modulo function and the total number of options (3 in this example): selected-index=H1 mod 3.

In one example of a cost-based selection policy 506, a respective cost metric with respect to transmission of network packets may be computed or determined for individual ones of the options of an ROG, and the lowest cost option may be selected for the network packets in some embodiments. If there are multiple options whose cost metric is identical, random selection may be used among those equal-cost options. This approach is conceptually similar to ECMP (Equal Cost Multi-Pathing). In at least some embodiments, as part of the message indicating the policy or in a separate communication via the programmatic interfaces of the VCS, a client on whose behalf the cost-based selection policy is to be applied may also indicate a cost metric determination methodology, which can be employed by the DPTMs and/or the VCS control plane to compute the respective cost metrics for the various routing options. In one embodiment, for example, the client may indicate that the DPTMs should use internal measures of transmission times between the DPTMs and the respective next hop addresses corresponding to each of the options as a cost metric. In other embodiments, the client may indicate an application-specific program to be executed to determine the cost metrics, or provide a network address to which a cost query can be directed from the DPTMs.

In some embodiments, a client may specify a failover-based selection policy 508, according to which one or more of the routing options of an ROG may be designated as primary or active options at a given point in time for traffic between a set of traffic sources and a set of network destinations, with the remaining option(s) being designated as non-primary or inactive/passive options. The status of a routing option may be changed from non-primary to primary in the event of detection of a failure associated with the current primary or current primaries. The DPTMs used for the traffic handled using the ROG may choose from among the one or more primary routing options when making their routing decisions for a given packet or flow. If there are multiple primary or active options, random selection may be used among them in some embodiments. In at least one embodiment, the client may indicate, via programmatic interfaces, a methodology (e.g., an executable program or a network address to which queries can be directed by DPTMs) which can be used to determine whether a given routing option is a primary or a non-primary routing option. In some embodiments, the client may indicate that the VCS may use its own internal resource health management techniques to determine whether a given routing option is currently a primary or not.

A client may specify a custom selection policy 510 in some embodiments, which may rely on application-specific logic to choose routing options. For example, such a policy may include rules or heuristics provided programmatically by the client, which are based on temporal workload distribution of the client's application, geographical distribution of the workload, and so on. In one example scenario, a client may specify an ROG comprising routing options RO1 and RO2, and a custom policy indicating the RO1 should be chosen during a time period T1 of each business day in a particular time zone, but that RO2 should be preferred during a different time period T2.

In at least some embodiments, a client may choose a hybrid policy 512 which combines aspects of some of the other categories shown in FIG. 5. For example, for a given ROG, a client may choose a hybrid of a failover and cost-based policy, with multiple ones of the routing options being designated as primary, and which cost metrics being used to choose among the primary options for a given packet flow. Routing option selection policies other than those shown in FIG. 5 may be specified by clients in one embodiment. In at least one embodiment, a client need not necessarily specify a policy for a given ROG. If the client does not specify a policy for an ROG, in some embodiments the VCS may apply a default policy such as a random selection policy.

Figure 6:
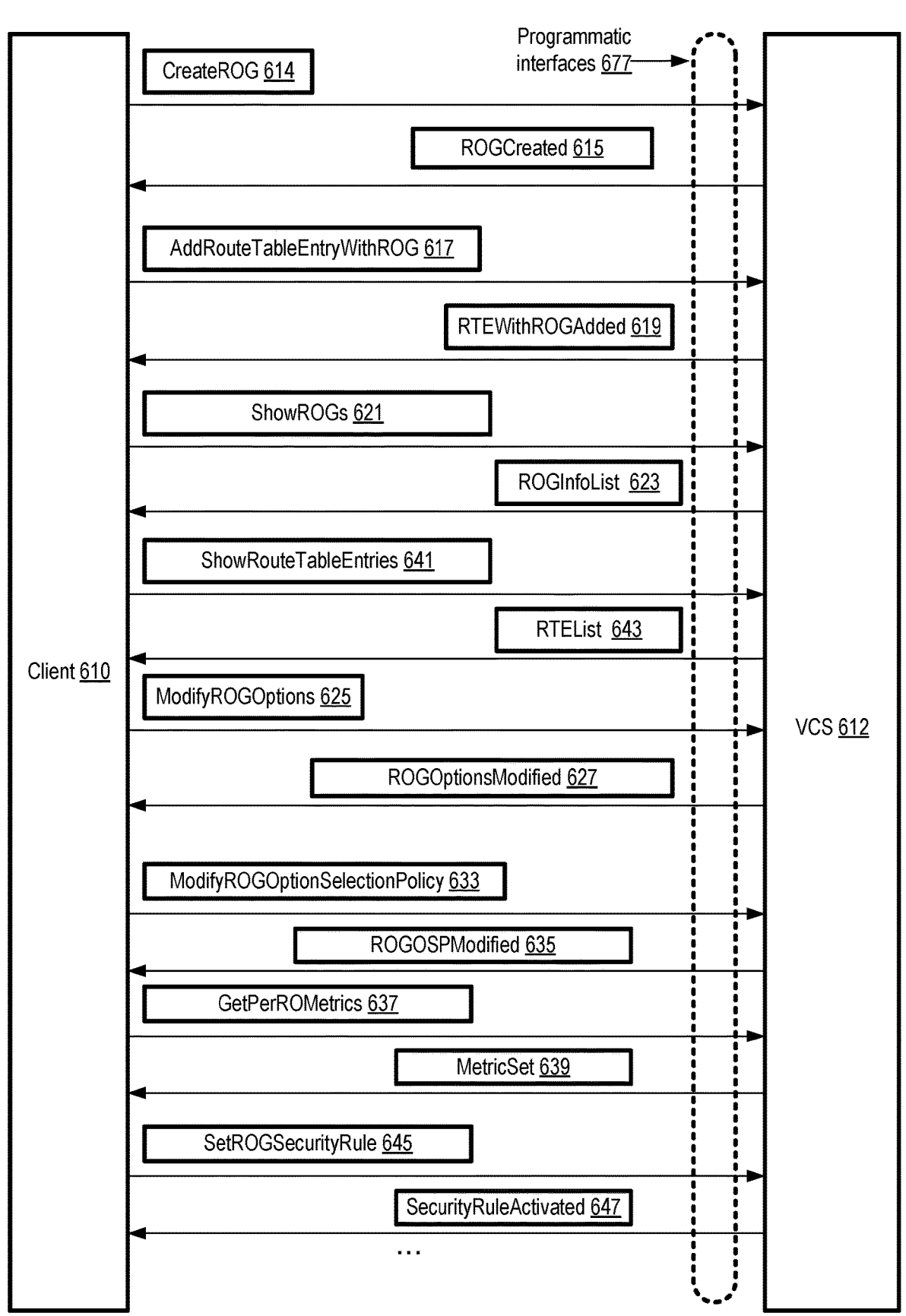
FIG. 6 illustrates example programmatic interactions, pertaining to the use of routing option groups, between customers and a virtualized computing service, according to at least some embodiments.

FIG. 6 illustrates example programmatic interactions, pertaining to the use of routing option groups, between customers and a virtualized computing service, according to at least some embodiments. A VCS 612, similar in features and functionality to VCS 105 of FIG. 1, may implement a set of programmatic interfaces 677 in the depicted embodiment, such as one or more web-based consoles, command-line tools, graphical user interfaces and/or APIs. Clients 610 may utilize the programmatic interfaces to submit requests and messages pertaining to the use of ROGs, and receive corresponding responses.

A client may, for example, submit a CreateROG request 614, requesting the creation of an ROG with an initial set of routing options (e.g., options belonging to one or more of the categories shown in FIG. 4) and an associated option selection policy (e.g., a policy of one of the categories shown in FIG. 5). In response, a control plane server (CPS) of the VCS may store metadata representing the requested ROG at a repository of the VCS, and send an ROGCreated message 615 to the client, containing a system-generated unique identifier or ID assigned to the ROG.

An AddRouteTableEntryWithROG request 617 may be submitted by the client, specifying various fields of a route table, including a set of networking destinations identified by a CIDR block, and details of the ROG with which the set of networking destinations is to be associated in some embodiments. In some embodiments, instead of submitting a CreateROG request followed by an AddRouteTableEntry-WithROG request, the client may specify the routing options and policy of the ROG via parameters of the AddRou-teTableEntryWithROG request itself. As such, the AddRou-teTableWithROG request may comprise a request to create the ROG and also to associate the ROG with destinations indicated in a particular entry of a route table. The VCS control plane may store a route table entry indicating the associated between the ROG and the set of networking destinations in a specified route table (e.g., a default route table of a VPC, or a subnet route table of the kind shown in FIG. 3) in various embodiments, and send an RTEWith-ROGAdded message 619 to the client. In at least some embodiments, the route table entry may specify an identifier of the ROG, and the details of the ROG may be stored elsewhere. In other embodiments, details such as the routing options and the option selection policy may also be represented in the route table entry itself.

The client may request the creation of numerous ROGs over time, and request, via a ShowROGs query 621, a list of the ROGs that were created in response to those requests. Information about the ROGs may be provided from the VCS control plane via one or more ROGInfoList messages 623 in the depicted embodiment. The ROGInfoList may, for example, include details such as the names or identifiers assigned to the ROGs, the routing options included in the ROGs, which route table entries contain the ROGs, the creation timestamps of the ROGs, and so on. Clients may also request details of individual ROGs via programmatic interfaces 677 in various embodiments.

A ShowRouteTableEntries request 641 may be submitted by a client to view the contents of one or more route tables, including any ROGs that are included as targets in the entries of the route tables. The requested list of route table entries may be provided to the client via one or more RTEList messages 643 in the depicted embodiment.

A client may request modifications of the routing options and/or the option selection policies of ROGs via programmatic interfaces 677 in various embodiments. For example, a ModifyROGOptions request 625 may be submitted, which may add or remove routing options from a specified ROG. In response, in various embodiments, a VCS control plane server may make the requested change to an ROG, and send an ROGOptionsModified response 627 to the client. At least in some embodiments, e.g., in which the ROGs are represented by ROG identifiers in route table entries, changes to an ROG which is represented in one or more entries of a given route table may be applied without modifying the route table itself, and without deleting/replacing route table entries. After the changes are made to the ROG in response to a ModifyROGOptions request, subsequent packets or packet flows whose routing/forwarding is managed using the ROG may be routed to their destinations by selecting a routing option from the changed set of routing options in accordance with the applicable client-selected option selection policy various embodiments.

In various embodiments, a client may submit a Modify-ROGOptionSelectionPolicy request 633 to change the policy that is to be used, going forward, for selecting routing options for packet flows or packets. The requested changes may be made, and an ROGOSPModified response 635 may be sent to the client in at least some embodiments. Various kinds of changes may be made to the policies in different embodiments, such as changes to the category of policy, changes to the methodologies used for computing cost metrics or primary/non-primary status, and so on. After the changes are made to the selection policy of an ROG in response to a ModifyROGOptionSelectionPolicy request, subsequent packets or packet flows whose routing/forwarding is managed using the ROG may be routed to their destinations by selecting a routing option from the changed set of routing options in accordance with the modified version of the option selection policy various embodiment.

In at least some embodiments, the VCS may collect and store metrics separately for each routing option of an ROG. For example, the total number of packets or packet flows that were transmitted using a next-hop address associated with individual routing options may be tracked, performance metrics such as packet delivery latencies, throughputs and the like may be captured per routing option, and so on. In response to the GetPerROMetrics request 637, the VCS may provide the available or requested per-routing-option metrics via one or more MetricSet messages 639 in the depicted embodiment. In some embodiments, a consolidated or aggregated version of the metrics for all the routing options of an ROG may also be provided at client request.

A client may submit a SetROGSecurityRule request 645 to the VCS 612 in some embodiments, indicating a security requirement or rule which is to be applied uniformly with respect to all of the routing options of a specified ROG. Firewall rules which indicate permitted sets of sources and/or destinations may be specified in some embodiments. Rules related to creating audit records which include information about all the sources and destinations whose traffic was managed using each of the routing options may be specified in at least one embodiment. The VCS control plane may send a SecurityRulesActivated message 647 to the client after saving the provided security rules and propagating them to DPTMs for implementation. The DPTMs may apply the rules to various network packets transmitted to/from the destinations associated with the ROG in the depicted embodiment.

In at least some embodiments, programmatic interactions pertaining to ROGs and their use, other than those shown in FIG. 6, may be supported by a VCS. For example, a client may in some embodiments submit a single ModifyROG request which includes changes to routing options of an ROG, and changes to the associated option selection policy.

FIG. 7 is a flow diagram illustrating aspects of operations, pertaining to routing option groups, which may be performed at a control plane of a network-accessible service of a cloud computing environment, according to at least some embodiments. As shown in element 701, a representation of an ROG ROG1 which includes a set of routing options of one or more of the categories shown in FIG. 3 may be created and stored, e.g., in response to a programmatic request received at a control plane server of a VCS. An associated policy for selecting individual options of ROG1 for respective packet flows (or individual packets) may be stored as well in at least some embodiments. The policy may also be specified in a programmatic request in various embodiments—e.g., the same programmatic request which led to the creation of the ROG, or a separate programmatic request.

A route table entry RTE1 indicating an association between ROG1 and a set of networking destinations (e.g., a CIDR block of IPV4 or IPV6 network addresses) may be stored in various embodiments at the VCS control plane (element 704). In some cases, a single request to create an ROG and also to store a route table entry which includes the ROG may be received and processed at the VCS control plane server.

In various embodiments, RTE1 (and/or other entries of the route table in which RTE1 is included) may be propagated by the control plane server to a set of data plane traffic managers (DPTMs) which are responsible for processing traffic to/from a set of traffic sources with which the route table is associated (element 707). For example, if RTE is in a VPC subnet route table of the kind shown in FIG. 3, the traffic sources may include compute instances whose attached VNIs have IP addresses within that subnet, and the DPTMs may be incorporated within network virtualization management components of the virtualization hosts of those compute instances. Such DPTMs may for example implement an encapsulation protocol to enable traffic to be sent from source addresses of an overlay network via physical paths and devices of the underlying substrate network of the VCS. In at least some embodiments, the route table entries may also be propagated to DPTMs at edge routing devices of the VCS and/or to DPTMs at various middle-boxes or networking intermediary appliances configured at the VCS.

The control plane servers of the VCS may process various kinds of ROG-related programmatic requests submitted by a client in the depicted embodiment, such as some or all of the kinds of requests indicated in FIG. 6. For example, in response to programmatic requests to change ROG1 membership and/or the associated option selection policy, the control plane servers may make the requested changes (e.g., by modifying metadata of the VCS) and propagate the requested changes to the DPTMs, without requiring RTE1 itself to be replaced or deleted (element 710).

FIG. 8 is a flow diagram illustrating aspects of operations, pertaining to routing option groups, which may be performed at data plane traffic managers of a network-accessible service of a cloud computing environment, according to at least some embodiments. As shown in element 801, an indication of an association between a set of networking destinations NDS1 and a routing option group ROG1, and an option selection policy which applies to ROG1 may be received, e.g., at a DPTM from a VCS control plane server. The DPTM may be responsible, at least in part, for handling data plane traffic originating at a set of sources such as a collection of compute instances of a VPC in the depicted embodiment.

From one of the traffic sources, a packet P1 of a packet flow PF1 which is directed from one of the sources to a network address ND1 within NDS1 may be obtained at the DPTM (element 804). Based on the policy received at the DPTM, the DPTM may select a particular routing option RO1 from ROG1 for the flow PF1 in the depicted embodiment (element 807). Implementing or applying the policy may involve, for example, analysis of potentially dynamically changing information such as cost metrics associated with individual ones of the routing options of ROG1, determination of primary/non-primary status of individual routing options with respect to a failover-based policy, and so on. Different routing options from ROG1 may be selected for respective packet flows in some cases, even if the packet flows are from the same traffic source to the same destination.

The DPTM may cause P1 to be sent to ND1 along a path in which a network address associated with the selected routing option RO1 is chosen as a next-hop address in the depicted embodiment (element 810). In some embodiments, subsequent packets of PF1 may also be sent along the same path to ND1.

It is noted that in various embodiments, some of the operations shown in the flow diagrams of FIG. 7 and/or FIG. 8 may be implemented in a different order than that shown in the corresponding figure, or may be performed in parallel rather than sequentially. Additionally, some of the operations shown in these flow diagrams may not be required in one or more implementations.

Figure 9:
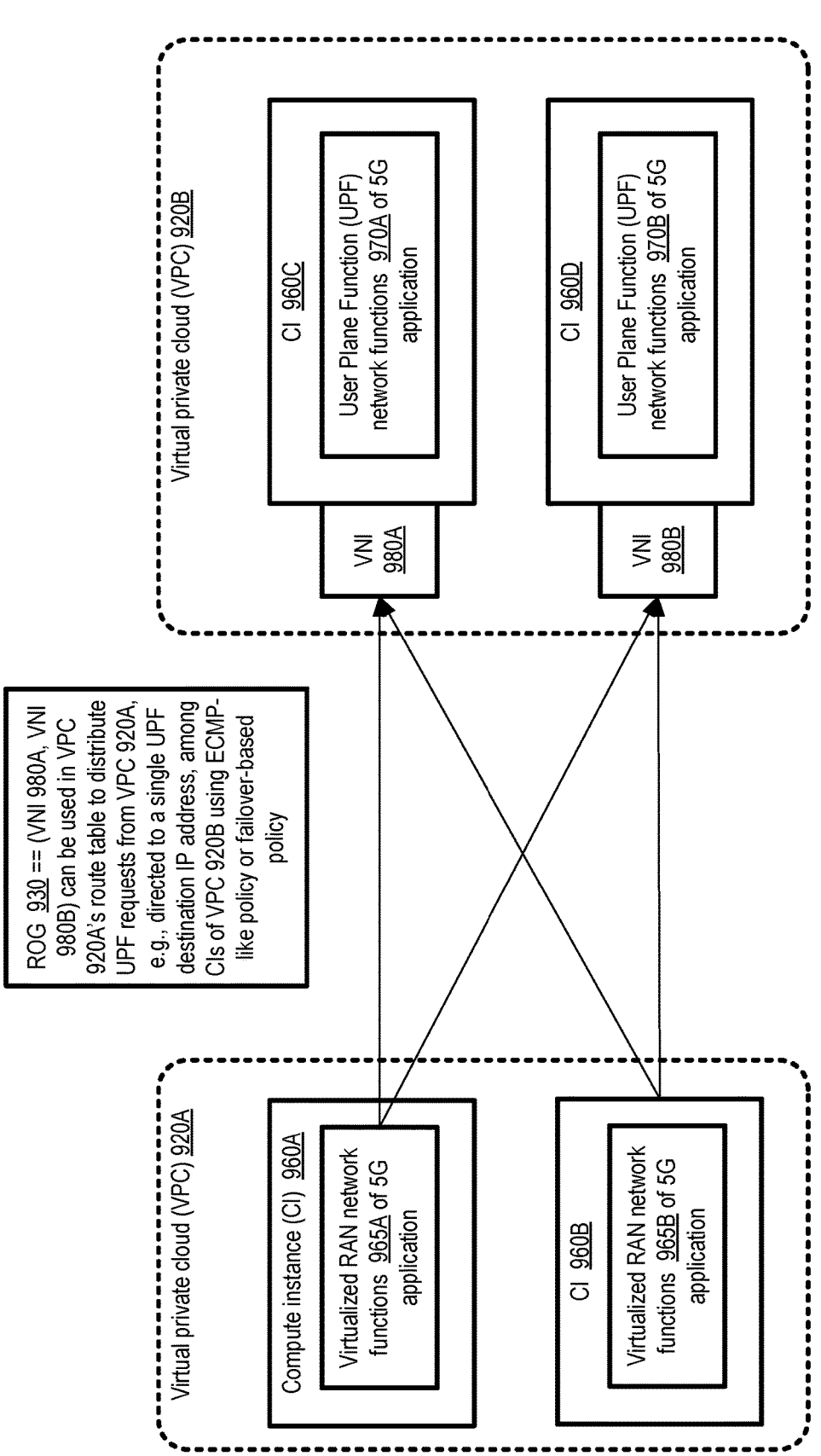
FIG. 9 illustrates an example scenario in which traffic directed to core network functions of a radio-based application may be managed using routing option groups, according to at least some embodiments.

FIG. 9 illustrates an example scenario in which traffic directed to core network functions of a radio-based application may be managed using routing option groups, according to at least some embodiments. In the depicted embodiment, compute instances within VPCs may be used to run various types of network functions of telecommunication applications, including applications which implement 5$^{th}$ generation (5G) radio-based telecommunication applications. A network function is a functional building block within a network infrastructure, which has well-defined external interfaces and a well-defined functional behavior. Network functions can be chained together in pipelines to form various kinds of radio-based applications. Network functions have historically been implemented as a physical network appliance or node; however, network functions can be virtualized as well.

In the example scenario depicted in FIG. 9, compute instances (CIs) 960A and 960B within VPC 920A may be used to execute virtualized radio access network (RAN) network functions 965A and 965B of a 5G application of a client of the cloud provider network. VPC 920B may include CIs 960C and 960D, at which user plane function (UPF) network functions 970A and 970B respectively of the 5G application may be run. CI 960C may be programmatically attached to VNI 980A, while CI 960D may be programmatically attached to VNI 980B.

The client may request the creation of an ROG 930 in the depicted embodiment to distribute 5G application messages (e.g., comprising results of execution of the virtualized RAN network functions 965A or 965B) among the CIs 960C and 960D. Identifiers of the VNIs 980A and 980B may be included as routing options in the ROG 930 by the client. The ROG 930 may be included in a route table entry of VPC 920A to distribute UPF requests from VPC 920A, e.g., directed to a single shared UPF destination IP address, among the CIs of VPC 920B. The client may choose to employ any of a variety of option selection policies for ROG 930 in different embodiments. For example, an ECMP-like policy in which both CIs 960C and 960D are configured in active mode concurrently (referred to as active/active mode) and used to process respective packet flows delivered via their respective VNIs may be used. Alternatively, a failover-based policy may be used in which the VNI of one of the CIs 960C or 960D is designated as a primary routing option at a given time (while the other VNI is designated as a non-primary option, but can assume the primary role if/when a failure associated with the primary is detected). Whichever VNI is selected for a given packet flow, a path which includes a next-hop address associated with that VNI (e.g., a substrate network address of the virtualization host at which the CI attached to the VNI runs) may be chosen for the packets directed to the UPFs from the virtualized RAN network functions by the DPTMs of VPC 920A in the depicted embodiment.

Figure 10:
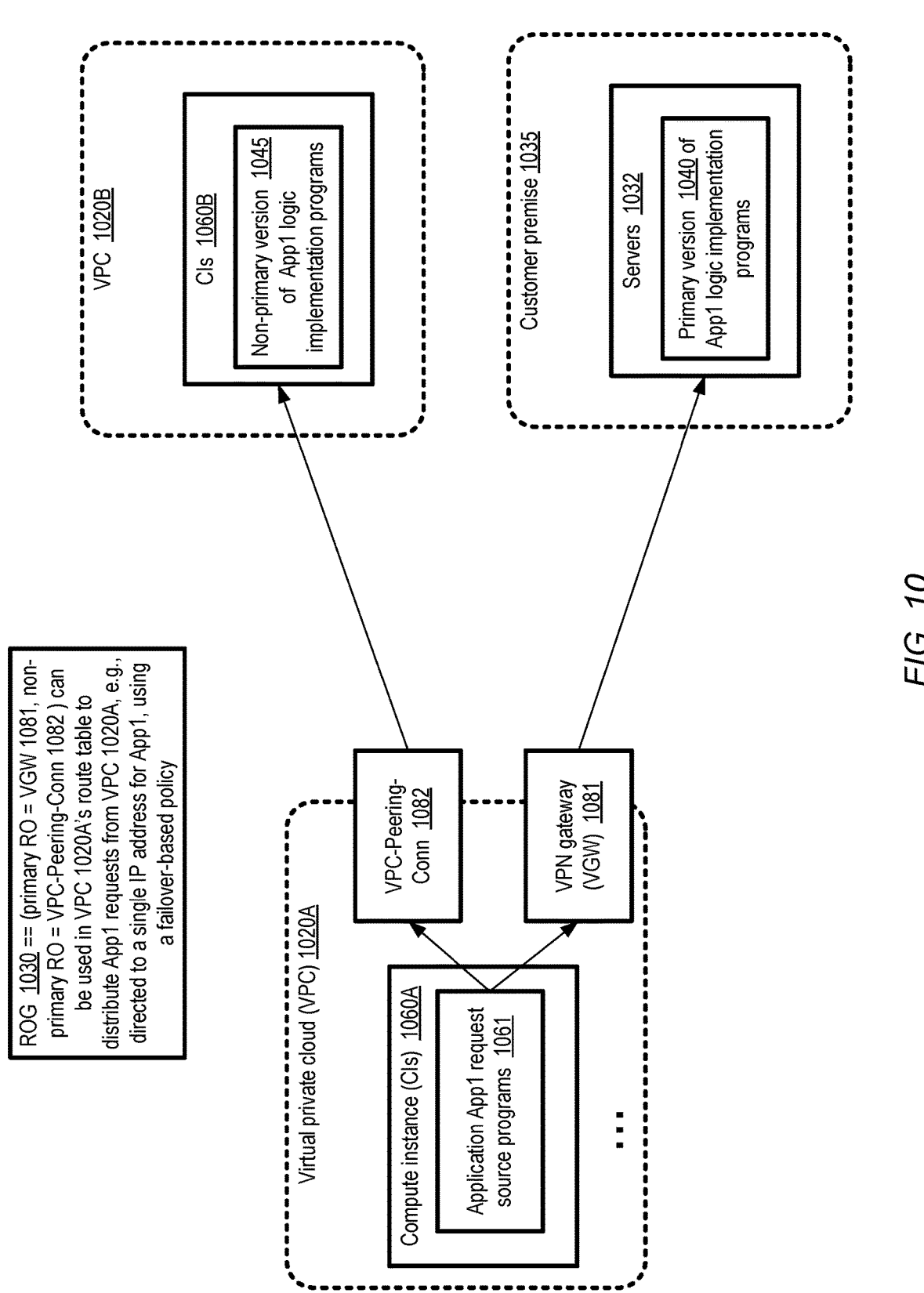
FIG. 10 illustrates an example scenario in which traffic directed to an application, of which respective versions are run at a virtual private cloud and a customer premise, may be managed using routing option groups, according to at least some embodiments.

FIG. 10 illustrates an example scenario in which traffic directed to an application, of which respective versions are run at a virtual private cloud and a customer premise, may be managed using routing option groups, according to at least some embodiments. In the example scenario shown in FIG. 10, at least two versions of an application App1 of a VCS client may be run. Application requests for App1 functionality may originate at programs 1061 running at CIs 1060A within a VPC 1020A. A primary version 1040 of a set of App1 logic implementation programs, which can process and generate responses to the application requests, may be run at servers 1032 located at a customer premise. A non-primary version 1045 of App1 logic implementation programs, which can also process and generate responses to the application requests, may be run at CIs 1060B of VPC 1020B.

A VPC-to-VPC peering connection VPC-Peering-Conn 1082 may be configured at the request of the client at VPC 1020A for communication with VPC 1020B in the depicted scenario. A VPN gateway (VGW) 1081 may be set up at VPC 1020A to enable communication via VPN tunnels with servers 1032 at customer premise 1035. At the request of the client, an ROG 1020 may be created to distribute application requests originating at CIs 1060A among the servers 1032 and the CIs 1060B in the depicted embodiment. At the point of time represented in FIG. 10, the ROG may indicate that the VGW is the primary routing option for an IP address (a destination address) of App1, and that VPC-Peering-Conn is a non-primary routing option. In accordance with a failover-based option selection policy chosen by the client for ROG 1030, DPTMs of VPC 1020A may select the VGW as the routing option for traffic directed to App1's network address (as long as the VGS remains the primary option), and send packets directed to App1 along a path which includes a next-hop address associated with the VGW. Such a next-hop address may, for example, be an IP address of an internal-use compute instance which is used to implement the VGW at the VCS.

In various embodiments, as mentioned above, the VCS at which ROGs of the kind introduced herein are created and used at client request may be implemented at a cloud provider network (sometimes referred to simply as a "cloud"). A cloud provider network refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services. As indicated earlier, a cloud provider network can be formed as a number of regions, with each region including two or more availability zones.

In some embodiments, compute instances of a VCS may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments. Extension locations may also be referred to as VCS outpost locations.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

Figure 11:
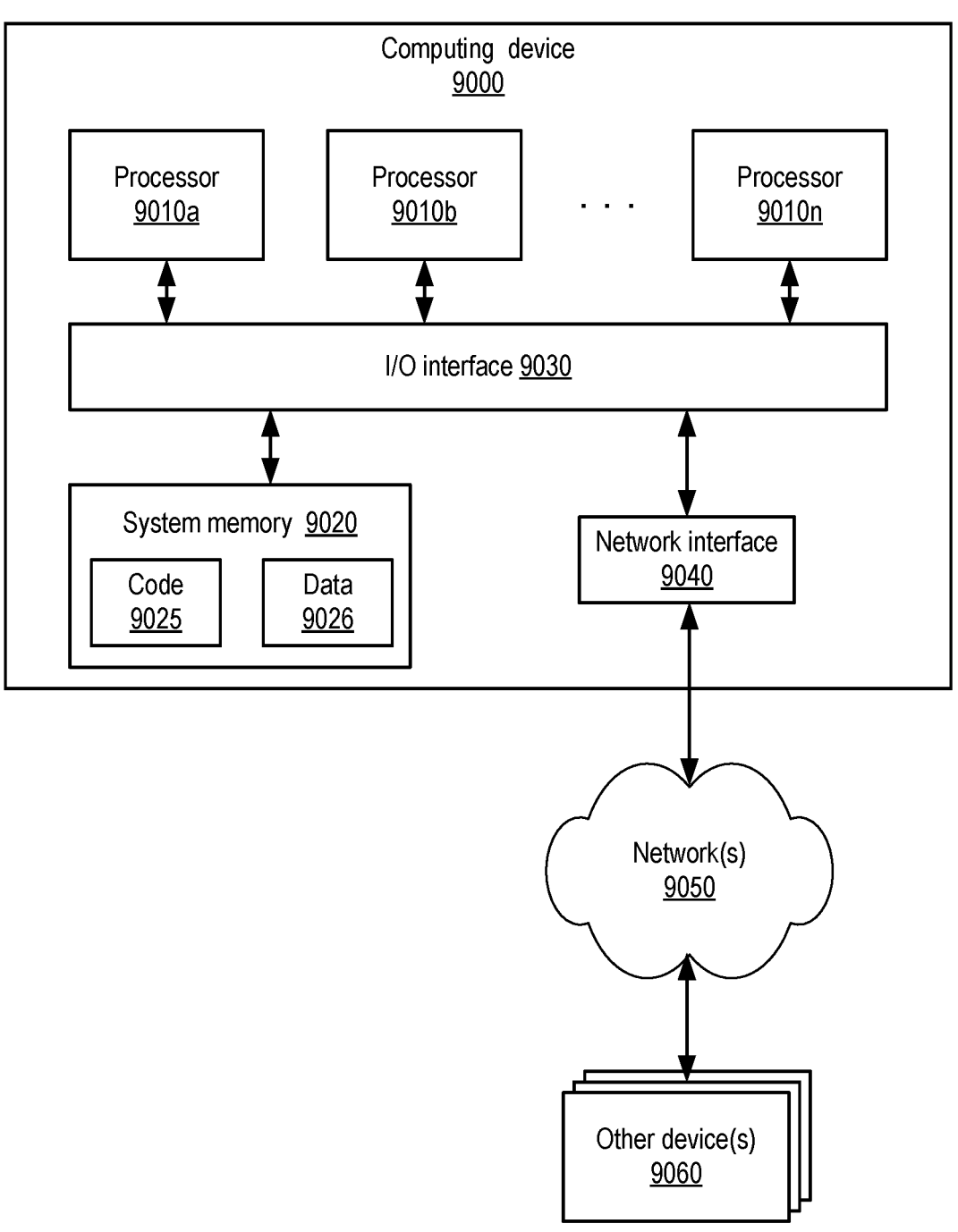
FIG. 11 is a block diagram illustrating an example computing device that may be used in at least some embodiments.

In at least some embodiments, a server that implements the types of techniques described herein (e.g., including the described functionality of VCS virtualization hosts, control plane servers and the like), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of a cloud computing environment; and
a data plane traffic manager of the cloud computing environment;
wherein the control plane server is configured to:
receive, via one or more programmatic interfaces from a client of the cloud computing environment, (a) a request to create, for network traffic directed to a set of destinations identified by a Classless Inter-Domain Routing (CIDR) block, a routing option group comprising a plurality of routing options including a first virtual network interface and a second virtual network interface and (b) a policy to select, for a particular packet flow of the network traffic directed to the set of destinations, a particular routing option from the routing option group;
store, in a route table of the cloud computing environment, an entry indicating an association between the set of destinations and the routing option group;
propagate, to the data plane traffic manager, an indication of the entry and the policy; and
present, to the client via the one or more programmatic interfaces, in response to a query, the routing option group; and
wherein the data plane traffic manager is configured to:
select, based at least in part on the entry and the policy, the first virtual network interface as a routing option for a first packet flow directed to a first destination of the set of destinations;
cause a first network packet of the first packet flow to be transmitted to the first destination via a first path which includes, as a next-hop address, a first network address associated with the first virtual network interface;
select, based at least in part on the entry and the policy, the second virtual network interface as a routing option for a second packet flow directed to the first destination; and
cause a second network packet of the second packet flow to be transmitted to the first destination via a second path which includes, as a next-hop address, a second network address associated with the second virtual network interface.

2. The system of claim 1, wherein to select the first virtual network interface as the routing option for the first packet flow, the data plane traffic manager is further configured to:
compute, based at least in part on the policy, a flow hash value from a set of headers of a packet of the first packet flow.

3. The system of claim 1, wherein to select the first virtual network interface as the routing option for the first packet flow, the data plane traffic manager is further configured to:
compare, based at least in part on the policy, a first cost metric with a second cost metric, wherein the first cost metric is associated with the first virtual network interface, and wherein the second cost metric is associated with the second virtual network interface.

4. The system of claim 3, wherein the control plane server is further configured to:
receive, from the client via the one or more programmatic interfaces, an indication of a cost metric determination methodology, wherein the first cost metric is determined using the cost metric determination methodology.

5. The system of claim 1, wherein the policy is a failover-based policy, and wherein to select the first virtual network interface as the routing option for the first packet flow, the data plane traffic manager is further configured to:

determine that the first virtual network interface is designated as a primary routing option of the failover-based policy, and the second virtual network interface is designated as a non-primary routing option.

6. A computer-implemented method, comprising:

receiving, at a cloud computing environment from a client, a request to create a routing option group comprising a plurality of routing options for packets directed to different destinations of a plurality of networking destinations;

storing, at the cloud computing environment, a representation of an association between the plurality of networking destinations and the routing option group;

propagating, to a traffic manager of the cloud computing environment, (a) an indication of the association and (b) a policy to be implemented to select, for a packet directed to a networking destination of the plurality of networking destinations, a routing option from among a plurality of routing options of the routing option group that is associated with the plurality of networking destinations; and selecting, from the routing option group, by the traffic manager based at least in part on the association and the policy, a first routing option for a first packet directed to a particular networking destination of the plurality of networking destinations; and causing, by the traffic manager, the first packet to be transmitted to the particular networking destination via a path which includes, as a next-hop address, a network address associated with the first routing option.

7. The computer-implemented method of claim 6, further comprising:

receiving, via one or more programmatic interfaces at the cloud computing environment from the client prior to said storing, the policy.

8. The computer-implemented method of claim 6, wherein the representation of the association comprises at least a portion of an entry of a route table, the computer-implemented method further comprising:

in response to receiving a request to modify the routing option group from the client via one or more programmatic interfaces at the cloud computing environment, updating the routing option group without disassociating the routing option group from the plurality of networking destinations; and subsequent to said updating, selecting, by the traffic manager, from a modified version of the routing option group obtained as a result of said updating, a second routing option for a second packet directed to the particular networking destination.

9. The computer-implemented method of claim 6, wherein the first routing option comprises one of: (a) a virtual network interface, (b) a gateway of the cloud computing environment, (c) a private network endpoint of the cloud computing environment, or (d) a virtual private cloud (VPC) peering connection identifier.

10. The computer-implemented method of claim 6, wherein said selecting the first routing option for the first packet comprises:

computing, based at least in part on the policy, a flow hash value from a set of headers of the first packet.

11. The computer-implemented method of claim 6, wherein said selecting the first routing option for the first packet comprises:

comparing, based at least in part on the policy, a first cost metric with a second cost metric, wherein the first cost metric is associated with the first routing option, and wherein the second cost metric is associated with a second routing option of the routing option group.

12. The computer-implemented method of claim 11, further comprising:

receiving, at the cloud computing environment from the client via one or more programmatic interfaces, an indication of a cost metric determination methodology, wherein the first cost metric is determined using the cost metric determination methodology.

13. The computer-implemented method of claim 6, wherein the policy is a failover-based policy, and wherein said selecting the first routing option for the first packet comprises:

determining that the first routing option is designated as a primary routing option of the failover-based policy, wherein the routing option group comprises at least one non-primary routing option.

14. The computer-implemented method of claim 13, further comprising:

receiving, at the cloud computing environment from the client via one or more programmatic interfaces, an indication of a methodology to be used to determine whether the first routing option is the primary routing option.

15. The computer-implemented method of claim 6, wherein the cloud computing environment comprises a plurality of availability zones including a first availability zone and a second availability zone, wherein the first routing option is configured within the first availability zone, wherein the routing option group comprises a second routing option, wherein the second routing option is configured within the second availability zone, and wherein said selecting the first routing option for the first packet comprises:

identifying an availability zone within which the first routing option is configured.

16. A non-transitory computer-accessible storage medium storing program instructions that when executed on or across a processor implement a traffic manager configured to:

receive, from a client, a request to create a routing option group comprising a plurality of routing options for packets directed to different destinations of a plurality of networking destinations;

obtain (a) a representation of an association between the plurality of networking destinations and the routing option group and (b) a policy for selecting, for a particular packet directed to a networking destination of the plurality of networking destinations, a routing option from among the plurality of routing options of the routing option group that is associated with the plurality of networking destinations;

select, from the routing option group, based at least in part on the association and the policy, a particular routing option for a network packet directed to a particular networking destination of the plurality of networking destinations; and cause the network packet to be transmitted to the particular networking destination via a path which includes, as a next-hop address, a network address associated with the particular routing option.

17. The non-transitory computer-accessible storage medium of claim 16, wherein the traffic manager runs at one of: (a) a virtualization manager of a virtualization host of a virtualized computing service of a cloud computing environment, or (b) an edge networking device of the cloud computing environment.

18. The non-transitory computer-accessible storage medium of claim 16, wherein the representation of the association between the plurality of networking destinations and the routing option group is stored in a route table configured for a first virtual private cloud of a cloud computing environment, wherein the network packet originates at a compute instance within the first virtual private cloud, and wherein the plurality of networking destinations comprise at least one networking destination within a second virtual private cloud of the cloud computing environment.

19. The non-transitory computer-accessible storage medium of claim 16, wherein traffic manager is implemented in a cloud computing environment, and wherein the network packet originates at a resource external to the cloud computing environment.

20. The non-transitory computer-accessible storage medium of claim 16, wherein the traffic manager is implemented in a cloud computing environment, and wherein the networking destination is external to the cloud computing environment.

* * * * *